(12) United States Patent
Okano et al.

(10) Patent No.: US 12,066,751 B2
(45) Date of Patent: Aug. 20, 2024

(54) SHOE APPARATUS, ACCESSORY, ACCESSORY SHOE APPARATUS, AND ELECTRONIC APPARATUS

(71) Applicant: CANON KABUSHIKI KAISHA, Tokyo (JP)

(72) Inventors: Yoshinobu Okano, Saitama (JP); Kenji Ishii, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 254 days.

(21) Appl. No.: 17/533,815

(22) Filed: Nov. 23, 2021

(65) Prior Publication Data

US 2022/0082911 A1 Mar. 17, 2022

Related U.S. Application Data

(63) Continuation of application No. PCT/JP2021/014319, filed on Apr. 2, 2021.

(30) Foreign Application Priority Data

Apr. 9, 2020 (JP) ................................ 2020-070625
Sep. 4, 2020 (JP) ................................ 2020-148939

(51) Int. Cl.
*G03B 17/56* (2021.01)
*G03B 15/02* (2021.01)
*H01R 13/631* (2006.01)

(52) U.S. Cl.
CPC ............ *G03B 17/566* (2013.01); *G03B 15/02* (2013.01); *H01R 13/631* (2013.01); *G03B 2215/056* (2013.01)

(58) Field of Classification Search
CPC ............ G03B 17/566; G03B 2215/056; H01R 13/631
See application file for complete search history.

(56) References Cited

U.S. PATENT DOCUMENTS 4,449,802 A 5/1984 Nakamura
4,887,120 A 12/1989 Kobayashi et al.
(Continued)

FOREIGN PATENT DOCUMENTS

CN 1960064 A 5/2007
CN 102457679 A 5/2012
(Continued)

OTHER PUBLICATIONS

A Jan. 3, 2023 Indian Office Action, which is enclosed, that issued in Indian Patent Application No. 202247063460.
(Continued)

*Primary Examiner* — Christopher E Mahoney
(74) *Attorney, Agent, or Firm* — Cowan, Liebowitz & Latman, P.C.

(57) ABSTRACT

A shoe apparatus includes an engagement portion with an accessory shoe apparatus included in an electronic apparatus, a plurality of connection terminals, where a first direction is an attachment direction to the accessory shoe apparatus, which are arranged in a second direction orthogonal to the first direction, and located on a front side of the engagement portion in the attachment direction, and a connector that includes protrusion portions that protrude in a third direction orthogonal to the first and second directions on both outer sides of the plurality of connection terminals in the second direction. The protrusion portion includes a slope portion on a side that does not face the plurality of connection terminals such that a width in the second direction at a position of a tip in the third direction is narrower than a width at a position away from the tip.

24 Claims, 16 Drawing Sheets

(56) References Cited

U.S. PATENT DOCUMENTS

| | | | |
|---|---|---|---|
| 5,384,611 A | 1/1995 | Tsuji et al. | |
| 6,753,921 B1 | 6/2004 | Shimizu | |
| 8,314,882 B2 | 11/2012 | Takano | |
| 8,891,954 B1 * | 11/2014 | Baker | G03B 15/03 396/176 |
| 9,049,378 B2 | 6/2015 | Motoki | |
| 9,703,173 B2 | 7/2017 | Brodie et al. | |
| 10,571,778 B2 | 2/2020 | Fujimura | |
| 2002/0177334 A1 | 11/2002 | Akama et al. | |
| 2005/0237426 A1 | 10/2005 | Takashima et al. | |
| 2007/0099455 A1 | 5/2007 | Rothermel et al. | |
| 2008/0152991 A1 | 6/2008 | Yoshitomi et al. | |
| 2008/0298793 A1 | 12/2008 | Clark | |
| 2009/0046150 A1 | 2/2009 | Hayakawa et al. | |
| 2009/0128688 A1 | 5/2009 | Takano | |
| 2012/0105711 A1 | 5/2012 | Kudo et al. | |
| 2012/0189292 A1 | 7/2012 | Kim et al. | |
| 2012/0195587 A1 | 8/2012 | Hasuda et al. | |
| 2012/0219281 A1 | 8/2012 | Imafuji et al. | |
| 2013/0002897 A1 | 1/2013 | Imafuji | |
| 2013/0010134 A1 | 1/2013 | Motoki | |
| 2013/0010185 A1 | 1/2013 | Motoki | |
| 2013/0028586 A1 | 1/2013 | Ide et al. | |
| 2013/0050510 A1 | 2/2013 | Fujihashi et al. | |
| 2013/0077952 A1 | 3/2013 | Sugiyama et al. | |
| 2013/0084061 A1 | 4/2013 | Imafuji et al. | |
| 2013/0223831 A1 | 8/2013 | Miyakawa et al. | |
| 2013/0266304 A1 | 10/2013 | Nishio et al. | |
| 2013/0302025 A1 | 11/2013 | Imafuji et al. | |
| 2014/0233936 A1 | 8/2014 | Imafuji et al. | |
| 2015/0049244 A1 | 2/2015 | Tokunaga et al. | |
| 2015/0062418 A1 | 3/2015 | Matsumoto et al. | |
| 2015/0109471 A1 | 4/2015 | Kudo et al. | |
| 2015/0116592 A1 | 4/2015 | Suzuki | |
| 2015/0222315 A1 | 8/2015 | O'Neill et al. | |
| 2015/0244924 A1 | 8/2015 | Motoki et al. | |
| 2015/0261069 A1 | 9/2015 | Imafuji et al. | |
| 2016/0227084 A1 | 8/2016 | Imamura | |
| 2016/0255276 A1 | 9/2016 | Sekimoto | |
| 2017/0075200 A1 | 3/2017 | Nishio et al. | |
| 2017/0219917 A1 | 8/2017 | Seo | |
| 2017/0222384 A1 * | 8/2017 | Seo | H04N 23/50 |
| 2018/0210324 A1 | 7/2018 | Harden | |
| 2018/0224718 A1 | 8/2018 | Ota et al. | |
| 2018/0348604 A1 | 12/2018 | Kamiya et al. | |
| 2018/0348609 A1 | 12/2018 | Ueda | |
| 2018/0348611 A1 | 12/2018 | Yamazaki et al. | |
| 2019/0129119 A1 | 5/2019 | Funaoka et al. | |
| 2019/0129127 A1 | 5/2019 | Goto et al. | |
| 2020/0007744 A1 | 1/2020 | Sugiyama | |
| 2020/0073209 A1 | 3/2020 | Fujihashi et al. | |
| 2020/0081328 A1 | 3/2020 | Ueda | |
| 2020/0142286 A1 | 5/2020 | Nishio et al. | |
| 2020/0174344 A1 | 6/2020 | Kamiya et al. | |
| 2020/0174348 A1 | 6/2020 | Kamiya et al. | |
| 2020/0225563 A1 | 7/2020 | Yamazaki et al. | |
| 2022/0221684 A1 | 7/2022 | Funaoka et al. | |
| 2022/0393398 A1 * | 12/2022 | Okano | G03B 17/566 |
| 2023/0168461 A1 | 6/2023 | Funaoka et al. | |

FOREIGN PATENT DOCUMENTS

| | | |
|---|---|---|
| CN | 102608838 A | 7/2012 |
| CN | 102650803 A | 8/2012 |
| CN | 102891962 A | 1/2013 |
| CN | 203241682 U | 10/2013 |
| CN | 203414714 U | 1/2014 |
| CN | 105637399 A | 6/2016 |
| CN | 105980925 A | 9/2016 |
| CN | 106170056 A | 11/2016 |
| CN | 107065401 A | 8/2017 |
| CN | 108628064 A | 10/2018 |
| CN | 108989612 A | 12/2018 |
| CN | 108989656 A | 12/2018 |
| CN | 109709754 A | 5/2019 |
| CN | 110661964 A | 1/2020 |
| EP | 2023607 A2 | 2/2009 |
| JP | H07234432 A | 9/1995 |
| JP | 09-185103 A | 7/1997 |
| JP | 2006-079053 A | 3/2006 |
| JP | 2006064763 A | 3/2006 |
| JP | 2008-159396 A | 7/2008 |
| JP | 4392363 B2 | 12/2009 |
| JP | 2012-189980 A | 10/2012 |
| JP | 2013-034172 A | 2/2013 |
| JP | 2013-047755 A | 3/2013 |
| JP | 2013-048404 A | 3/2013 |
| JP | 2013-076971 A | 4/2013 |
| JP | 2013178351 A | 9/2013 |
| JP | 2013-238874 A | 11/2013 |
| JP | 2013-257411 A | 12/2013 |
| JP | 5445479 B2 | 3/2014 |
| JP | 2015-023076 A | 2/2015 |
| JP | 2015-075503 A | 4/2015 |
| JP | 2015075504 A | 4/2015 |
| JP | 2015-099396 A | 5/2015 |
| JP | 5955136 B2 | 7/2016 |
| JP | 2016-166967 A | 9/2016 |
| JP | 2016-212228 A | 12/2016 |
| JP | 2017-138457 A | 8/2017 |
| JP | 2017-151160 A | 8/2017 |
| JP | 2017-151161 A | 8/2017 |
| JP | 2017138455 A | 8/2017 |
| JP | 2018-084681 A | 5/2018 |
| JP | 2018-205738 A | 12/2018 |
| JP | 2018-207427 A | 12/2018 |
| JP | 2019-008054 A | 1/2019 |
| JP | 2019-078931 A | 5/2019 |
| JP | 2019071674 A | 5/2019 |
| JP | 2019-113872 A | 7/2019 |
| JP | 2020-024378 A | 2/2020 |
| JP | 2020-027266 A | 2/2020 |
| KR | 101780022 B1 | 9/2017 |
| TW | 201344330 A | 11/2013 |
| TW | M490590 U | 11/2014 |
| TW | 201903504 A | 1/2019 |
| TW | 201903507 A | 1/2019 |
| TW | 201910899 A | 3/2019 |
| WO | 2015/068492 A1 | 5/2015 |
| WO | 2017/073081 A1 | 5/2017 |

OTHER PUBLICATIONS

A Jan. 17, 2023 Indian Office Action, which is enclosed, that issued in Indian Patent Application No. 202247062985.
Nov. 17, 2022 Indian Office Action, which is enclosed, that issued in Indian Patent Application No. 202147053802.
Dec. 1, 2022 Indian Office Action, which is enclosed, that issued in Indian Patent Application No. 202147054728.
Dec. 8, 2022 Indian Office Action, which is enclosed, that issued in Indian Patent Application No. 202147054709.
Nov. 3, 2023 Supplementary Partial European Search Report, which enclosed, that issued in European Patent Application No. EP21785644.2.
Jun. 2, 2023 U.S. Notice of Allowance, which is enclosed, that issued in U.S. Appl. No. 17/533,860.
Jun. 28, 2023 Chinese Office Action, which is enclosed with an English Translation, that issued in Chinese Patent Application No. 202180003706.1.
PCT/IB/338 (PCT Notification of Transmittal of Translation of the International Preliminary Report on Patentability) that issued on Oct. 20, 2022 in International application No. PCT/JP2021/014319; PCT/IB/373 (PCT International Preliminary Report on Patentability) that issued on Oct. 20, 2022 in International application No. PCT/JP2021/014319;PCT/ISA/237 (PCT Written Opinion of the International Searching Authority) that issued on Oct. 20, 2022 in International application No. PCT/JP2021/014319.
An Indonesian Office Action and Search Report issued on Dec. 15, 2023, which is enclosed, with translation, that issued in the Indonesian Patent Application No. P00202110538.

(56) References Cited

OTHER PUBLICATIONS

The above patent documents were cited in the Feb. 23, 2024 Korean Office Action, which is enclosed with an English Translation, that issued in Korean Patent Application No. 10-2021-7037947.

Mar. 5, 2024 India Office Action, which is enclosed without an English Translation, that issued in India Patent Application No. 202247062985.

European Search Report issued Mar. 20, 2024.

Jan. 24, 2024 European Search Report, which is enclosed, that issued in the corresponding European Patent Application No. 21785644.2.

The above patent documents were cited in a European Search Report issued on May 16, 2024, a copy of which is enclosed, that issued in the corresponding European Patent Application No. 21785552.7.

"Multi Interface Shoe", Nov. 11, 2012 (Nov. 11, 2012), pp. 1-4, XP093159025, Retrieved from the Internet: URL: https://en.wikipedia.org/wiki/Multi_Interface_Shoe; Mar. 5, 2024.

The above patent document #1 and Non-Patent Literature Document #1 were cited in a European Search Report issued on May 21, 2024, a copy of which is enclosed, that issued in the corresponding European Patent Application No. 21784006.5.

The above foreign document #1 and Non-Patent Literature Document #1 were cited in a European Search Report issued on May 21, 2024, a copy of which is enclosed, that issued in the corresponding European Patent Application No. 21783816.8.

The above foreign patent documents were cited in the May 17, 2024 Chinese Office Action, a copy of which is enclosed without an English Translation, that issued in Chinese Patent Application No. 202180027368.5.

European Search Report issued on Jun. 25, 2024, a copy of which is enclosed, that issued in the corresponding European Patent Application No. 21784456.2.

The above patent document was cited in the Jun. 18, 2024 U.S. Office Action, a copy of which is not enclosed that issued in U.S. Serial No. 17/961,156.

The above U.S. patent publications were cited in the Jul. 1, 2024 U.S. Office Action, a copy of which is enclosed that issued in U.S. Appl. No. 17/961,110.

* cited by examiner

SHOE APPARATUS, ACCESSORY, ACCESSORY SHOE APPARATUS, AND ELECTRONIC APPARATUS

CROSS-REFERENCE TO RELATED APPLICATIONS

This application is a Continuation of International Patent Application No. PCT/JP2021/014319, filed on Apr. 2, 2021, which claims the benefit of Japanese Patent Applications Nos. 2020-070625, filed on Apr. 9, 2020, and 2020-148939, filed on Sep. 4, 2020, each of which are hereby incorporated by reference herein in their entirety.

BACKGROUND OF THE INVENTION

Field of the Invention

The present invention relates to a shoe apparatus provided to an accessory and configured to enable the accessory to be attached to and detached from an electronic apparatus, and an accessory shoe apparatus provided to the electronic apparatus.

Description of the Related Art

An image pickup apparatus (electronic apparatus), such as a digital camera, includes an accessory shoe apparatus attachable to and detachable from a shoe apparatus of an accessory such as an illumination apparatus (flash unit). The accessory shoe apparatus includes an engagement member engaged with and configured to hold the shoe apparatus, and each of the accessory shoe apparatus and the shoe apparatus includes a connection terminal for enabling a bidirectional communication between the image pickup apparatus and the accessory. Conventionally, the number of connection terminals is often five.

On the other hand, Japanese Patent Laid-Open No. 2018-084681 discloses an electronic viewfinder having a shoe apparatus attachable to and detachable from an accessory shoe apparatus of an image pickup apparatus, and the accessory shoe apparatus and the shoe apparatus maintain the compatibility with the five conventional connection terminals (communication pins) and increase the number of connection terminals within the shape of the engagement member.

However, if the shoe apparatus having a large number of connection terminals as disclosed in Japanese Patent Laid-Open No. 2018-084681 gives priority to securing an area necessary to arrange those connection terminals, an area for providing a shape for protecting those communication terminals and a positioning area between components are limited.

SUMMARY OF THE INVENTION

The present invention provides a compact shoe apparatus and accessory shoe apparatus, each of which can secure an area for providing a large number of connection terminals and a shape for protecting them, and a positioning area between components.

A shoe apparatus according to one aspect of the present invention includes an engagement portion with an accessory shoe apparatus included in an electronic apparatus, a plurality of connection terminals, where a first direction is an attachment direction to the accessory shoe apparatus, which are arranged in a second direction orthogonal to the first direction, and located on a front side of the engagement portion in the attachment direction, and a connector that includes protrusion portions that protrude in a third direction orthogonal to the first and second directions on both outer sides of the plurality of connection terminals in the second direction. The protrusion portion includes a slope portion on a side that does not face the plurality of connection terminals such that a width in the second direction at a position of a tip in the third direction is narrower than a width at a position away from the tip.

A shoe apparatus according to another aspect of the present invention includes an engagement portion with an accessory shoe apparatus included in an electronic apparatus, a plurality of connection terminals, where a first direction is an attachment direction to the accessory shoe apparatus, which are arranged in a second direction orthogonal to the first direction, and located on a front side of the engagement portion in the attachment direction, a connector that includes protrusion portions that protrude in a third direction orthogonal to the first and second directions on both outer sides of the plurality of connection terminals in the second direction, and a contact portion provided at a position between the engagement portion and the protrusion portion in the second direction and configured to contact the accessory shoe apparatus. The contact portion has a different width in the second direction in an area that contacts the accessory shoe apparatus, depending on a position in the third direction.

A shoe apparatus according to another aspect of the present invention includes an engagement portion with an accessory shoe apparatus included in an electronic apparatus, a plurality of connection terminals, where a first direction is an attachment direction to the accessory shoe apparatus, which are arranged in a second direction orthogonal to the first direction, and located on a front side of the engagement portion in the attachment direction, and a connector located at a position at which the connector is aligned with the plurality of connection terminals in a third direction orthogonal to the first direction and the second direction. The engagement portion is located at a position outside the plurality of connection terminals in the second direction. The connector is configured so that a lower end in the third direction of a tip portion in the first direction is provided at a position that is below the plurality of connection terminals in the third direction and outside of an end of the engagement portion on a side of the plurality of connection terminals in the second direction.

An accessory shoe apparatus according to another aspect of the present invention is attachable to and detachable from an accessory in a first direction. The accessory shoe apparatus includes a plurality of connection terminals arranged in a second direction orthogonal to the first direction, a holding member configured to hold the plurality of connection terminals, and an engagement portion with the accessory. The holding member includes groove portions on both sides of the plurality of connection terminals in the second direction. The groove portion includes a slope portion that faces an inside in the second direction and tilts to the second direction.

Further features of the present invention will become apparent from the following description of exemplary embodiments with reference to the attached drawings.

BRIEF DESCRIPTION OF THE DRAWINGS

FIG. 1 is a block diagram illustrating a configuration of a digital camera according to a first embodiment of the present invention.

DESCRIPTION OF THE EMBODIMENTS

Referring now to the accompanying drawings, a description will be given of embodiments according to the present invention. A description will now be given of an imaging system that includes a digital camera (image pickup apparatus) as an example of an electronic apparatus equipped with an accessory shoe apparatus, and an external flash unit (illumination apparatus) as an example of an accessory equipped with a shoe apparatus attachable to and detachable from the accessory shoe apparatus of the digital camera. The accessory provided with the shoe apparatus is not limited to the flash unit, but includes a variety of accessories such as an electronic viewfinder unit, a motion image capturing microphone, a conversion adapter, a variety of measurement apparatuses, and a sub camera. The electronic apparatus provided with the accessory shoe apparatus also includes a variety of electronic apparatuses other than the image pickup apparatus.

First Embodiment

Figure 1:
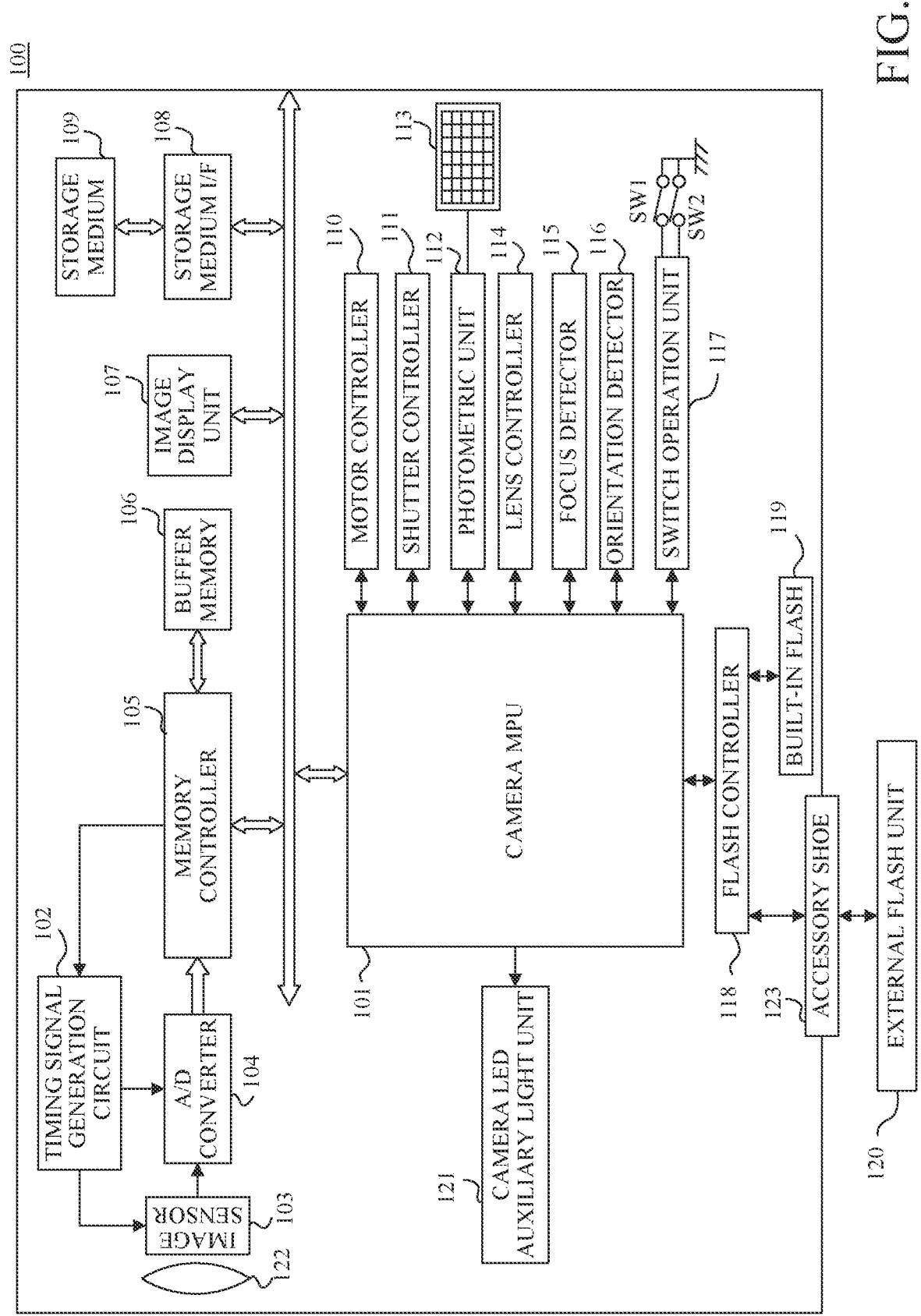

FIG. 1 illustrates a configuration of a digital camera (simply referred to as a camera hereinafter) 100. The camera 100 includes a camera MPU 101 as a microcomputer, an imaging optical system 122, a timing signal generation circuit 102, an image sensor 103, an A/D converter 104, a memory controller 105, and a buffer memory 106. The camera 100 further includes an image display unit 107, a storage medium I/F 108, a motor controller 110, a shutter controller 111, a photometric unit 112, a multi-division photometric sensor 113, a lens controller 114, a focus detector 115, an orientation detector 116, and a switch operation unit 117. The camera 100 further includes a flash controller 118, a built-in flash 119, a camera LED auxiliary light unit 121, and an accessory shoe apparatus (simply referred to as an accessory shoe hereinafter) 123. An external flash unit 120 as an accessory is attached to the accessory shoe 123. A storage medium 109, such as a semiconductor memory, is attachable to and detachable from the camera 100.

The camera MPU 101 controls the entire imaging sequence of the camera 100 and the entire imaging system. The imaging optical system 122 has a plurality of lens units, such as a zoom lens and a focus lens, a diaphragm, a shutter, and the like, and forms an optical image (object image) of light from the field on the image sensor 103. The image sensor 103 is an image sensor, such as a CCD sensor or a CMOS sensor, that captures (photoelectrically converts) an optical image. The timing signal generation circuit 102 generates a timing signal necessary to operate the image sensor 103.

The A/D converter 104 converts an analog signal read out of the image sensor 103 into a digital signal (image data). The memory controller 105 controls reading and writing of an unillustrated memory, a refresh operation of the buffer memory 106, and the like. The buffer memory 106 temporarily stores the image data output from the A/D converter 104 and the display image data for displaying the image on the image display unit 107. The image display unit 107 has a display device, such as a liquid crystal panel or an organic EL panel, and displays image data stored in the buffer memory 106.

The storage medium I/F 108 is an interface that enables communications between the attached storage medium 109 and the camera MPU 101. Another storage medium, such as a hard disk or an optical disk, may be built in the camera 100.

The motor controller 110 controls an unillustrated motor in accordance with a signal from the camera MPU 101 to move up and down an unillustrated mirror and charge the shutter. The shutter controller 111 controls the exposure of the image sensor 103 by running the front curtain and the rear curtain of the shutter in accordance with the signal from the camera MPU 101. The multi-division photometric sensor 113 measures the luminance of each of a plurality of divided areas in an imaging screen. The photometric unit 112 outputs a luminance signal indicating the luminance of each area to the camera MPU 101.

The camera MPU 101 calculates AV (aperture value) for an exposure adjustment, TV (shutter speed), ISO (sensitivity of the image sensor 103), etc. based on the luminance signal acquired from the photometric unit 112. The photometric unit 112 outputs to the camera MPU 101 the luminance signal when the built-in flash 119 or the external flash unit 120 makes a preliminary light emission (pre-light emission) toward the field, and calculates a light emission amount (main light emission amount) of the external flash unit 120 during the main imaging (pre-light emission).

The lens controller 114 communicates with the camera MPU 101 via an unillustrated mount contact, and controls the focus and aperture value of the imaging optical system 122 through controls of an unillustrated lens drive motor and an unillustrated diaphragm drive motor. The focus detector 115 detects a defocus amount of the imaging optical system 122 using a focus detection method such as a phase difference detection method. The camera MPU 101 calculates a driving amount of the focus lens based on the detected defocus amount, and controls the lens drive motor through the lens controller 114 for autofocusing (AF).

The orientation detector 116 detects a tilt of the camera 100 in the rotation direction around the optical axis of the imaging optical system 122. The switch operation unit 117 includes a first switch (SW1) that is turned on by a first stroke operation (half press) of an unillustrated release button, and a second switch (SW2) that is turned on by a second stroke operation (full press) of the release button, and outputs an ON signal from each of them to the camera MPU 101. The camera MPU 101 starts an imaging preparation operation such as AF and photometry in response to the ON signal from SW1, and starts an imaging (exposure) operation in response to the ON signal from SW2. The switch operation unit 117 also outputs a signal corresponding to the operation of an unillustrated operation member other than SW1 and SW2 to the camera MPU 101.

The flash controller 118 controls the light emission (pre-light emission, main light emission, auxiliary light emission, etc.) of the built-in flash 119 and the external flash unit 120 mounted on the accessory shoe 123 according to the instruction from the camera MPU 101. When the flash controller 118 detects that the external flash unit 120 is attached to the accessory shoe 123, the flash controller 118 starts supplying the power to the external flash unit 120 via the accessory shoe 123. The detailed configuration of the accessory shoe 123 will be described later.

The camera LED auxiliary light unit 121 irradiates onto the field near-infrared light (LED auxiliary light) with a predetermined pattern used as auxiliary light for the focus detection by the focus detector 115. The camera MPU 101 controls the light emission of auxiliary light by the built-in flash 119 or the external flash unit 120 for focus detection based on the luminance signal from the photometric unit 112. More specifically, the camera MPU 101 instructs the built-in flash 119 or the external flash unit 120 to emit the auxiliary light via the flash controller 118. The camera MPU 101 can also instruct the camera LED auxiliary light unit 121 or the LED auxiliary light unit 207 of the external flash unit 120 illustrated in FIG. 2 to emit the LED auxiliary light via the flash controller 118.

Figure 2:
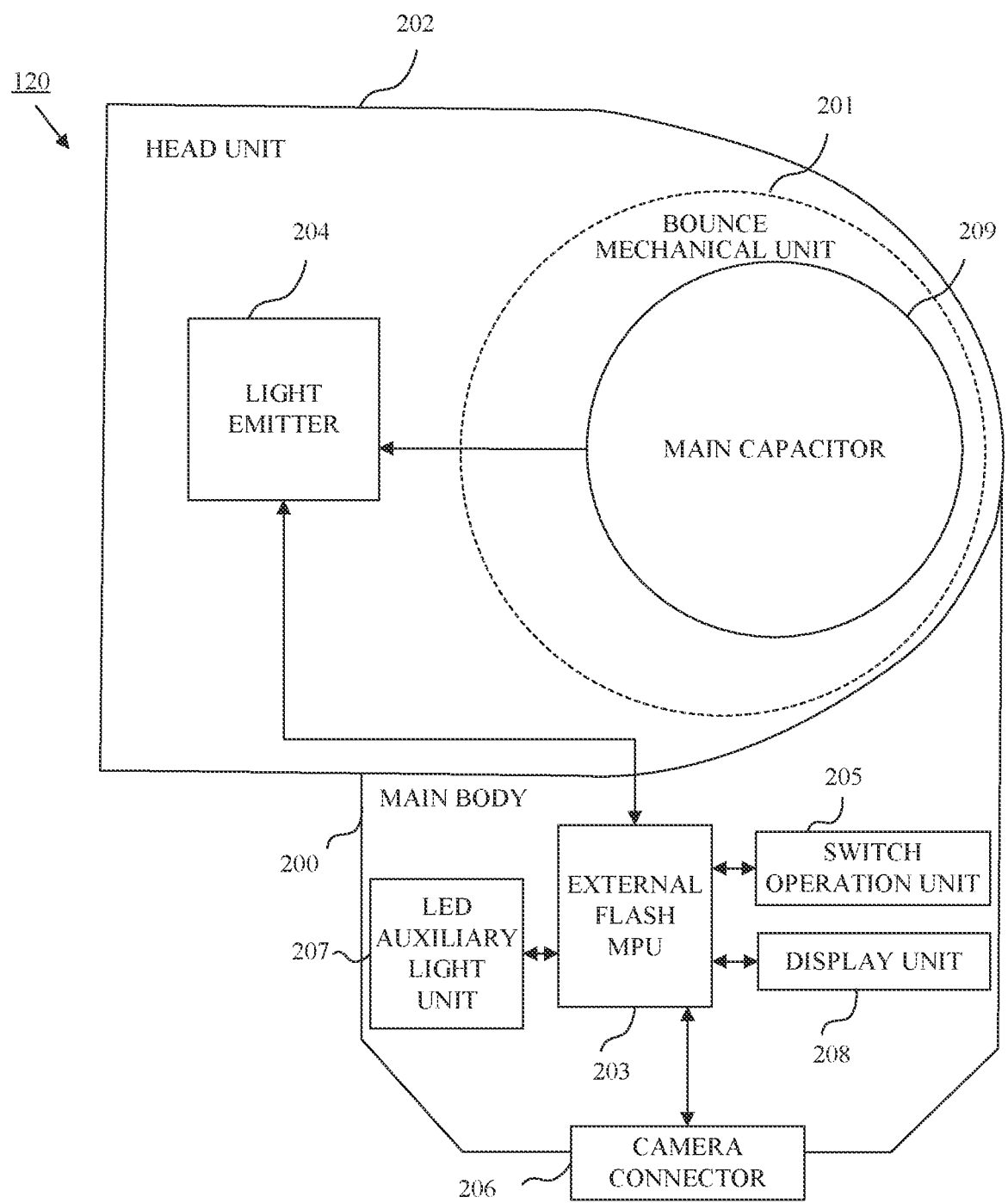
FIG. 2 is a block diagram illustrating a configuration of an external flash unit according to the first embodiment.

FIG. 2 illustrates the configuration of the external flash unit 120. The external flash unit 120 includes a main body 200, a bounce mechanical unit 201, and a head unit 202. The main body 200 includes an external flash MPU 203, a main capacitor 209, a variety of operation units 205 including a power switch, a display unit 208, an LED auxiliary light unit 207, and a camera connector 206.

The external flash MPU 203 is mounted on an unillustrated main board and controls all operations including the light emission control sequence of the external flash unit 120. The camera connector 206 is a shoe apparatus that mechanically and electrically connects the external flash unit 120 to the accessory shoe 123 of the camera 100. The camera MPU 101 and the external flash MPU 203 communicate with each other via the flash controller 118, the accessory shoe 123, and the camera connector 206. The detailed configuration of the camera connector 206 will be described later.

Similar to the camera LED auxiliary light unit 121, the LED auxiliary light unit 207 irradiates onto the field the LED auxiliary light such as near-infrared light having a predetermined pattern as the auxiliary light during the focus detection by the focus detector 115 in accordance with the camera MPU 101. The bounce mechanical unit 201 is a mechanism for rotating the head unit 202 in the horizontal direction or the vertical direction relative to the main body 200 to change the light emitting direction of the illumination light (flash) from the head unit 202. Use of the bounce mechanical unit 201 can indirectly illuminate the object and perform imaging (bounce imaging). The head unit 202 has a light emitter 204 that emits a flash of light. The light emitter 204 includes a light emitting discharge tube (xenon tube or the like), a light source such as an LED, a reflector, a Fresnel lens, and a light emission circuit. The light emission circuit causes the light source to emit a flash of light according to a signal from the external flash MPU 203.

Figure 3A:
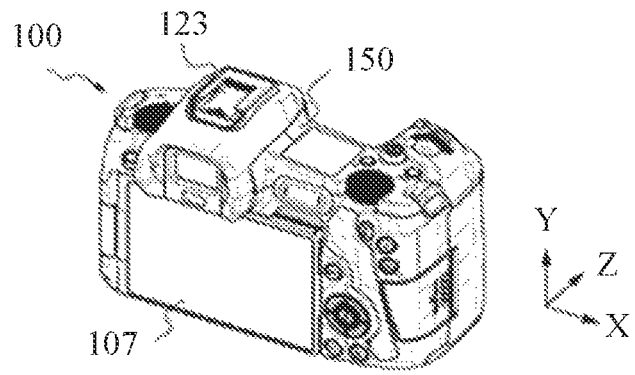
FIG. 3A is a perspective view of the digital camera.
Figure 3B:
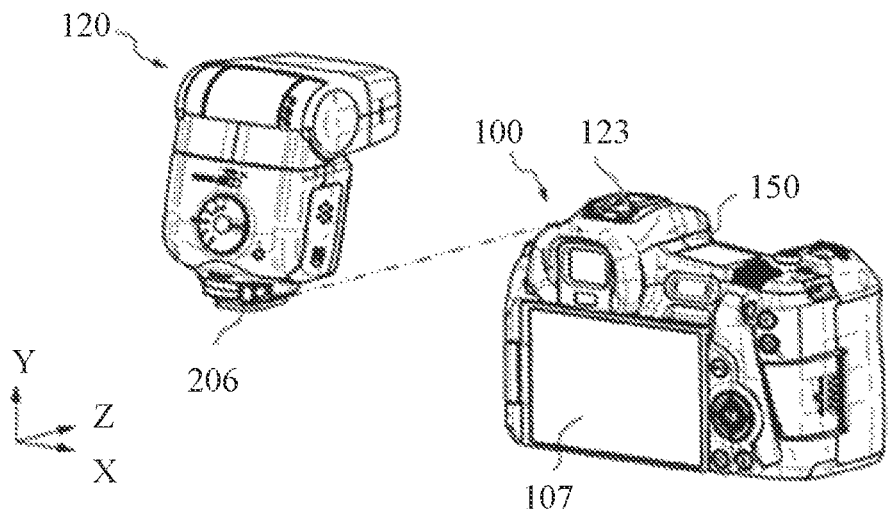
FIG. 3B is a rear perspective view of the digital camera and an external flash unit that is not attached to it.
Figure 3C:
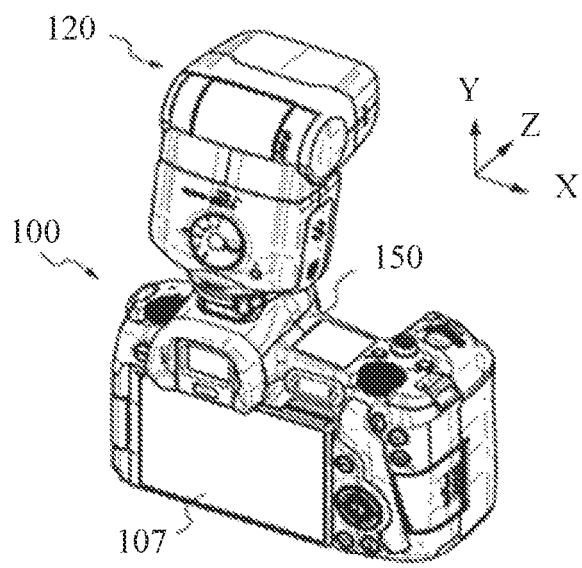
FIG. 3C is a rear perspective view of the digital camera and an external flash unit that is attached to the digital camera.

FIG. 3A illustrates the camera 100 viewed from the diagonally rear side. FIG. 3B illustrates how to attach the external flash unit 120 to the accessory shoe 123 of the camera 100. FIG. 3C illustrates the external flash unit 120 attached to the camera 100 when viewed from the oblique rear side.

The imaging optical system 122 illustrated in FIG. 1 is provided on the front side (field side) of the camera 100, and the image display unit 107 is provided on the rear side of the camera 100. A top cover 150 as an exterior member is provided on the top surface of the camera 100, and an accessory shoe 123 is provided to the top cover 150. On the other hand, in the external flash unit 120, the camera connector 206 is provided at the bottom of the external flash unit 120.

As illustrated in FIG. 3B, the external flash unit 120 is slid in a direction parallel to the front side in the Z direction (corresponding to the attachment side in the first direction and the front side in the attachment direction) relative to the camera 100 to engage the camera connector 206 and the accessory shoe 123 with each other. Thereby, the external flash unit 120 can be attached to the camera 100. The front side in the Z direction is a direction from the rear side to the front side of the camera 100, that is, a direction from the image display unit 107 side toward the imaging optical system 122 side. An X direction (second direction), a Y direction (third direction), and the Z direction (front-back direction) illustrated in FIGS. 4A and 4B and subsequent figures are commonly used. The X direction is a direction orthogonal to the Z direction in the horizontal plane when the Z direction is parallel to the horizontal direction, and is the width direction of the camera 100. The Y direction is a direction orthogonal to the Z direction and the X direction, and is the height direction of the camera 100.

Figure 4A:
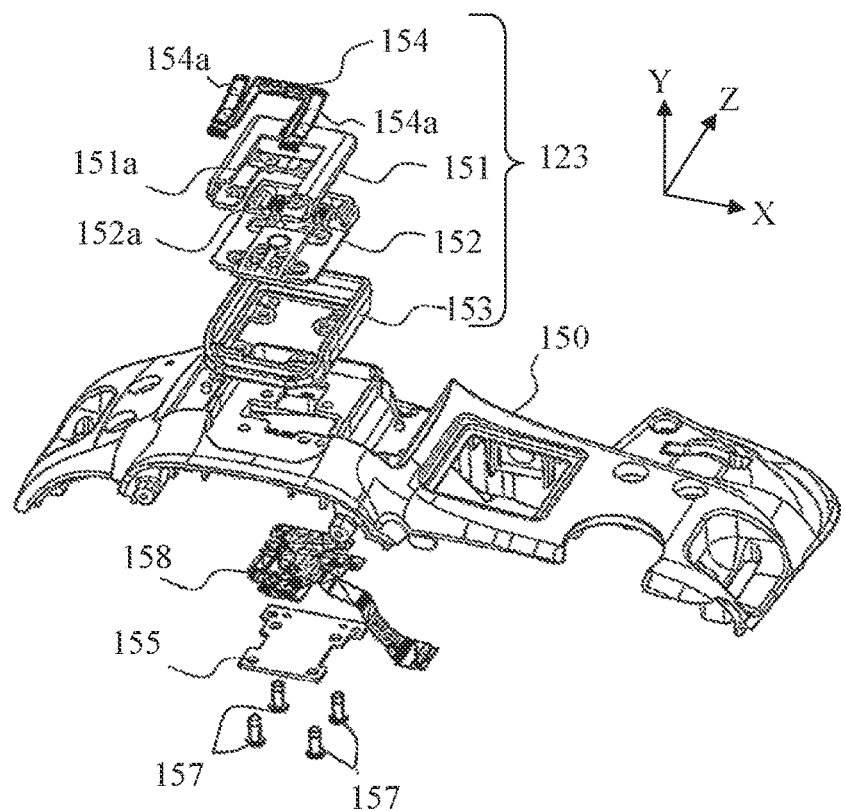
FIG. 4A is an exploded view of an accessory shoe according to the first embodiment.
Figure 4B:
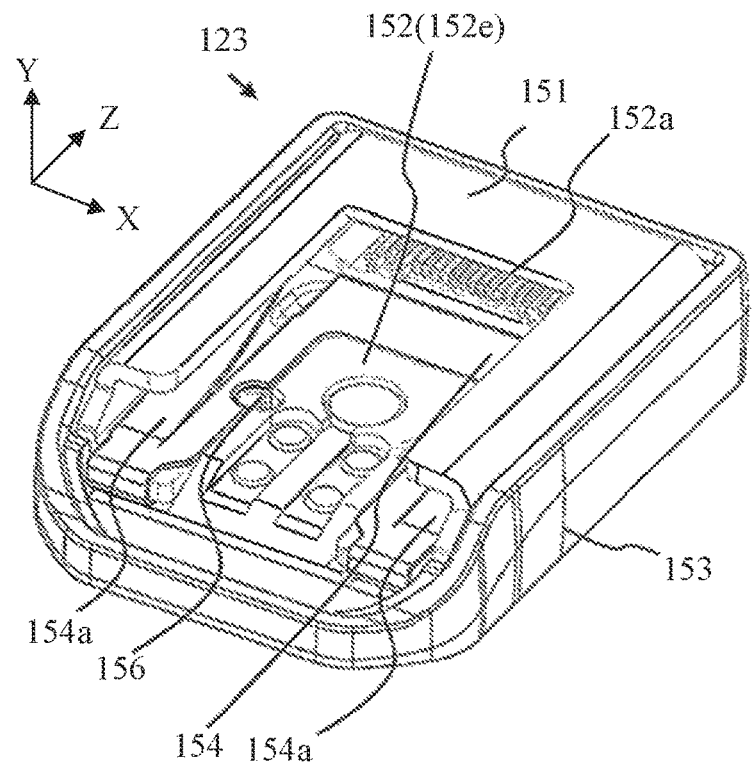
FIG. 4B is a perspective view of the accessory shoe according to the first embodiment.

A detailed description will now be given of the accessory shoe 123 of the camera 100. FIG. 4A illustrates the top cover 150 and the exploded accessory shoe 123. FIG. 4B illustrates the assembled accessory shoe 123. The assembly direction of the accessory shoe 123 onto the top cover 150 is the Y direction.

Figure 6A:
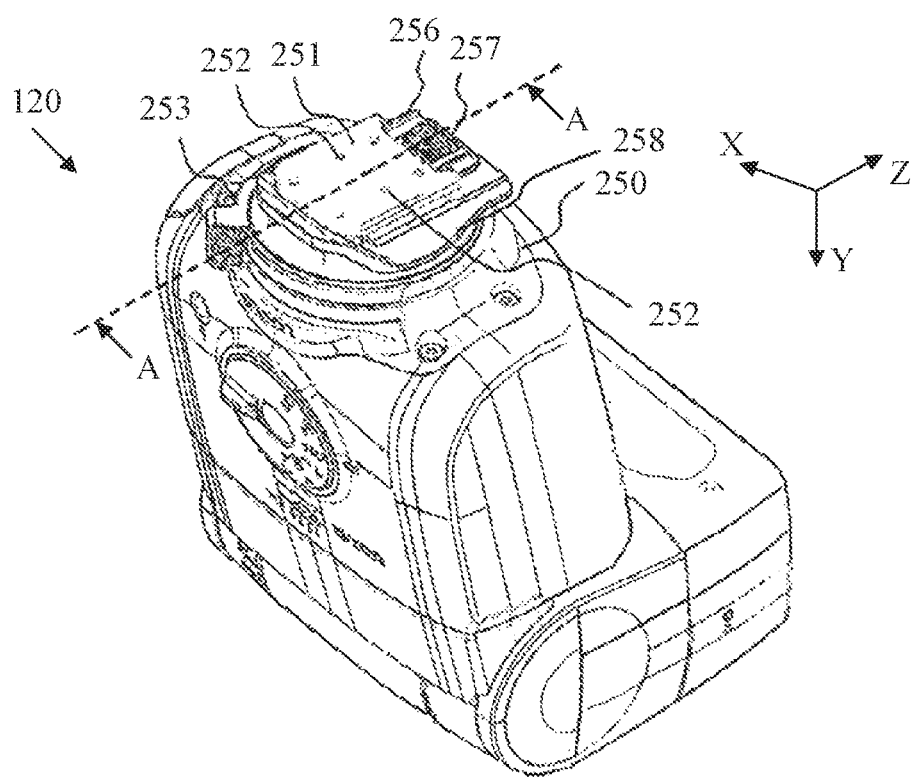
FIG. 6A is a bottom perspective view of the external flash unit.

The accessory shoe 123 includes an engagement member 151, a connection terminal connector 152, a shoe stage 153, and an accessory shoe spring 154. The engagement member 151 is a member for holding the external flash unit 120 through an engagement with the external flash unit 120. The connection terminal connector 152 includes a plurality of connection terminals 152a arranged at regular pitches in the X direction on a connector base member 152e as a holding member made of a resin material or the like and held by the connector base member 152e. In the connection terminal connector 152, the connection terminals 152a are arranged on the front side in the Z direction as the attachment direction of the external flash unit 120 (on the front side of the camera 100) as illustrated in FIG. 4B. An engagement hole portion 156 to be engaged with a lock pin 252 of the external flash unit 120 illustrated in FIG. 6A is provided behind the connection terminal connector 152 in the Z direction (on the rear side of the digital camera 100).

While the external flash unit 120 is attached to the accessory shoe 123, the connection terminals 152a are electrically connected to the external flash unit 120. Each of the plurality of connection terminals 152a is electrically connected to a flexible substrate 158 disposed on the lower side of the top cover 150 in the Y direction. The flexible substrate 158 is connected to an unillustrated main substrate of the camera 100. Thus, when the external flash unit 120 is attached to the accessory shoe 123, a communication is available between the external flash unit 120 and the camera 100.

The shoe stage 153 is a housing member that encloses the engagement member 151 and the connection terminal connector 152. An accessory shoe holding member 155 is a structural skeleton that holds the engagement member 151. As illustrated in FIG. 4A, the accessory shoe holding member 155, the flexible substrate 158, the top cover 150, the shoe stage 153, and the connection terminal connector 152 are fastened to the engagement member 151 by four screws 157 that are inserted into them. Thereby, these members are mutually positioned and fixed. By arranging the four screws 157 one by one in four areas equally divided in the X direction and the Z direction, the above components can be connected in a well-balanced manner.

Figure 5A:
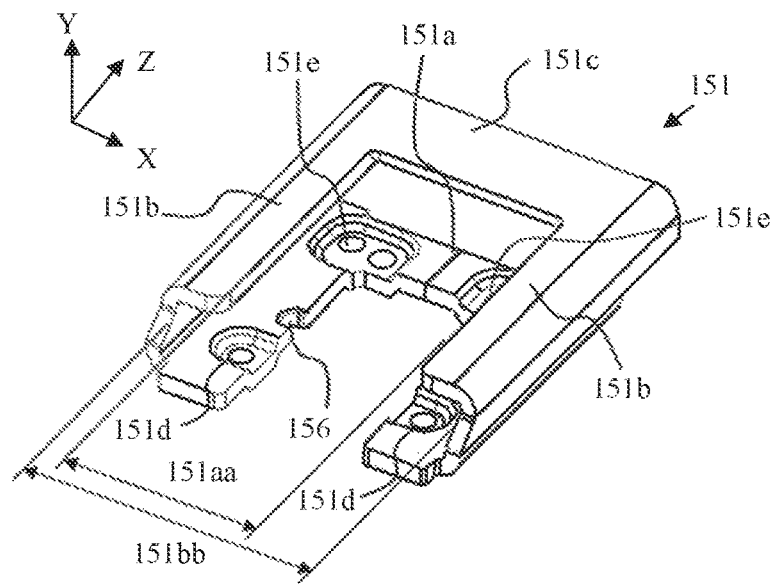
FIG. 5A is a top perspective view illustrating an engagement member of the accessory shoe.
Figure 5B:
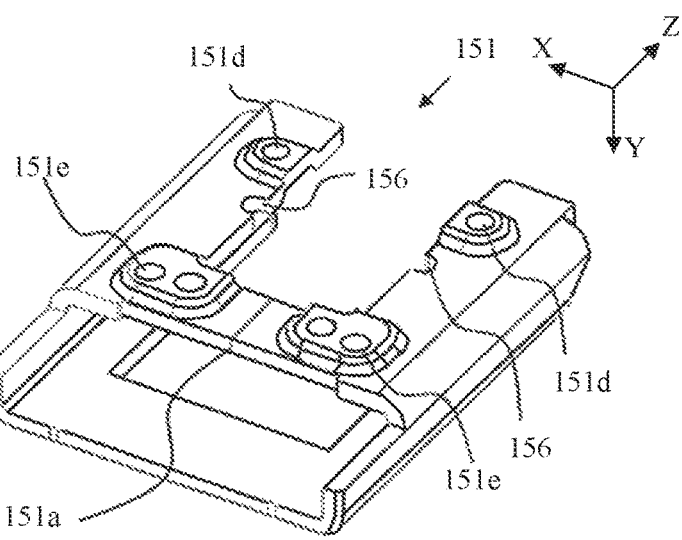
FIG. 5B is a bottom perspective view illustrating the engagement member of the accessory shoe.
Figure 5C:
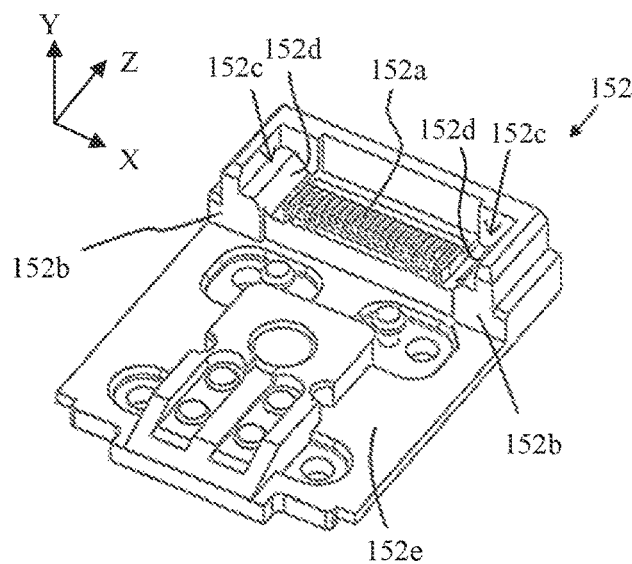
FIG. 5C is a perspective view illustrating a structure of a connection terminal connector of the accessory shoe.
Figure 11:
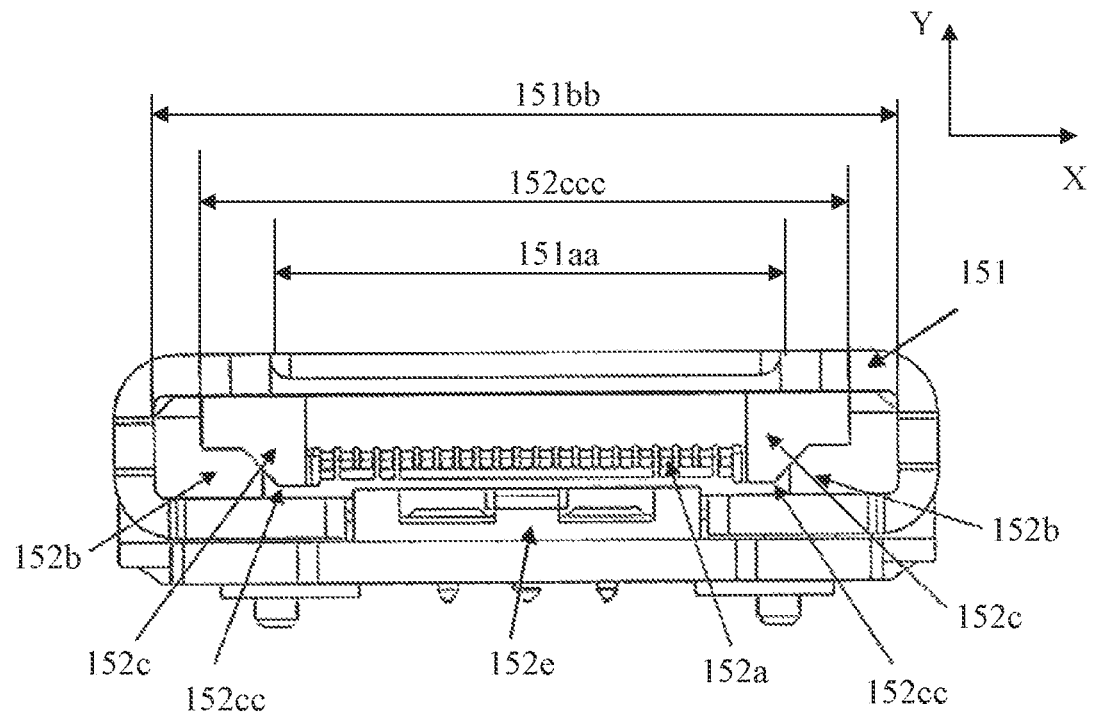
FIG. 11 is a front view of the accessory shoe according to the first embodiment.

FIG. 5A illustrates the structure on the top surface side of the engagement member 151, and FIG. 5B illustrates the structure on the bottom surface side of the engagement member 151. FIG. 5C illustrates the structure of the connection terminal connector 152 on the top surface side. FIG. 11 illustrates the accessory shoe 123 viewed from the insertion direction of the external flash unit 120.

The engagement member 151 is formed by bending a metal plate in a loop shape so that the end surfaces of the bent ends face and contact each other at a seam 151a. The engagement member 151 has a pair of engagement portions 151b, and a coupler 151c that couples the pair of engagement portions 151b together. The engagement member 151 has a pair of first screw hole portions 151d used for fastening the screws 157 and a pair of second screw hole portions 151e. The engagement member 151 has engagement hole portions 156 to be engaged with the lock pins 252 of the external flash unit 120.

Figure 6B:
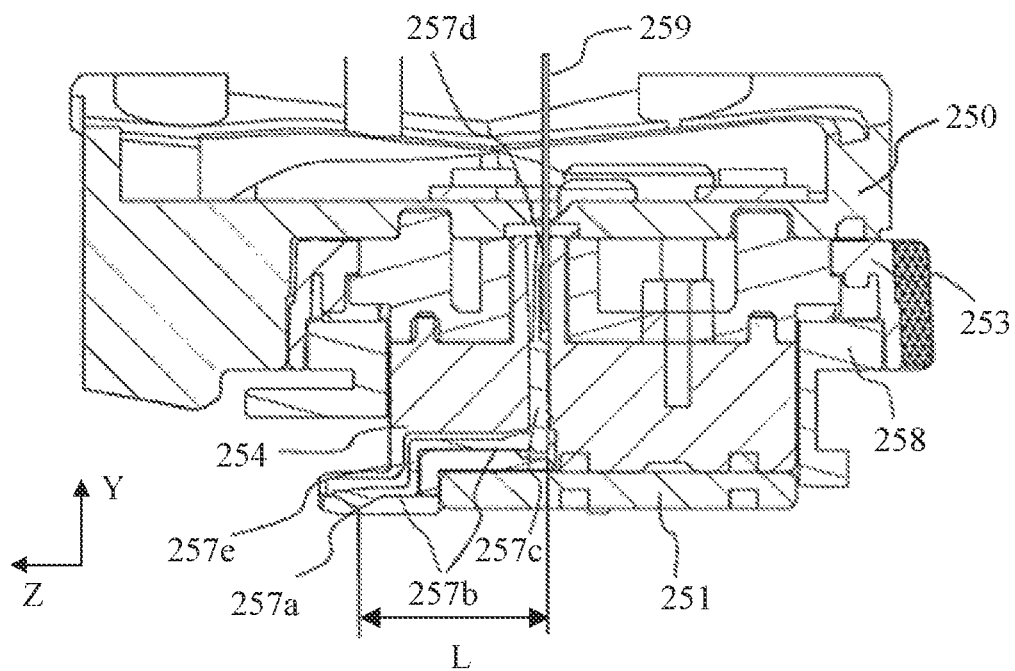
FIG. 6B is a sectional view of the external flash unit.

As illustrated in FIGS. 5A and 11, the pair of engagement portions 151b are separated by a first width (referred to as engagement portion interval hereinafter) 151aa in the X direction. A holding member 254 of the external flash unit 120, which will be described later, illustrated in FIG. 6B is inserted into the engagement portion interval 151aa. The pair of first screw hole portions 151d are provided at a predetermined interval in the X direction, and serve as a pair of first fastening hole portions provided apart from each other in the X direction at the back (on the rear side) in the Z direction. The pair of second screw hole portions 151e are provided at a predetermined interval in the X direction, and serve as a pair of second fastening hole portions provided apart from each other in the X direction at the front in the Z direction. The engagement hole portion 156 is formed at a position engageable with the lock pin 252 of the external flash unit 120 in an area sandwiched between the pair of first screw hole portions 151d.

In the connection terminal connector 152, as illustrated in FIGS. 4B and 5C, a plurality of connection terminals 152a are exposed. In the pitch direction (X direction) in which the plurality of connection terminals 152a are aligned, the position of the camera connector 206 is determined by the engagement portion interval 151aa of the engagement member 151. Therefore, the holding member 254 of the external flash unit 120 is positioned relative to the connection terminal connector 152 by the engagement member 151.

As illustrated in FIG. 11, on both sides of the connection terminal connector 152 (connector base member 152e) sandwiching the plurality of connection terminals 152a in the X direction on the front side in the Z direction, there are formed contact surfaces 152b that contact and position the accessory shoe 123 in the Z direction when the external flash unit 120 is attached, and groove portions 152c into which the accessory shoe 123 is inserted. Each groove portion 152c is formed so as to extend from the contact surface 152b to the front side (attachment side) in the Z direction, and has a slope portion 152d so as to face inwardly and diagonally upwardly (so as to have a tilt to the X direction). Part of the groove portion 152c above the slope portion 152d extends outwardly in the X direction from the position of the top end of the slope portion 152d. This is to prevent a dent (sink) from being generated in the slope portion 152d during resin molding if the slope portion 152d is formed up to the top end of the groove portion 152c.

As illustrated in FIG. 11, in the X direction, an outermost inner surface 152ccc of the groove portion 152c in the connector base member 152e of the accessory shoe 123 is located outside of the inner end surfaces of the pair of engagement portions 151b of the engagement member 151 (engagement portion interval 151aa) and is located inside of the outermost inner surface 151bb of the engagement member 151.

A slope start position 152cc, which is the end (lower end) of the slope portion 152d on the bottom surface side of the groove portion 152c, is provided inside the engagement portion interval 151aa. Thereby, it is possible to secure an area for providing the contact surface 152b that comes into contact with a contact portion 251b described later of the camera connector 206 and positions it in the Z direction. Providing the slope shape starting from the slope start position 152cc can expand a space into which the shoe apparatus (camera connector 206 described later) of the external flash unit 120 is inserted, and can secure the degree of freedom in the shape of the shoe apparatus. As a result, the shoe apparatus of the external flash unit 120 can be sufficiently formed with a shape that protects the connection terminals.

Figure 7A:
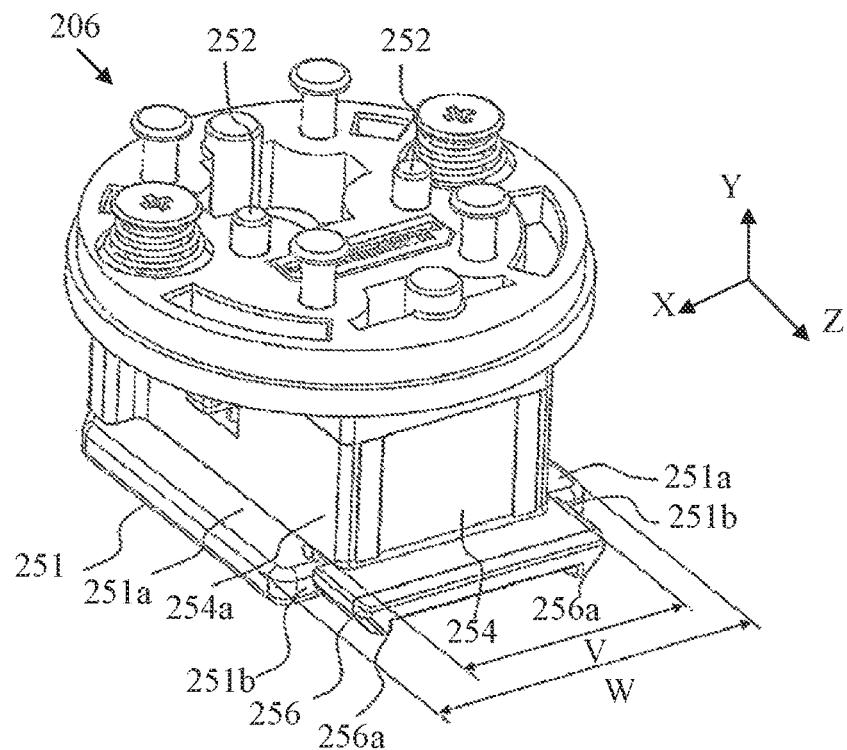
FIG. 7A is a perspective view illustrating an internal structure of a camera connector according to the first embodiment.
Figure 7B:
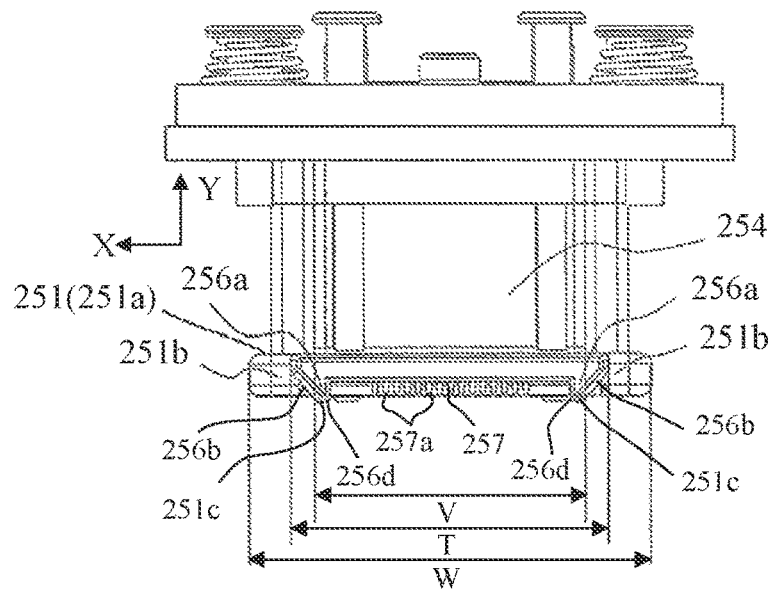
FIG. 7B is a front view illustrating the internal structure of the camera connector.

A description will now be given of the external flash unit 120. FIG. 6A illustrates the external flash unit 120 viewed from the camera connector 206 side (bottom side in the Y direction). FIG. 6B is a section taken along a line A-A in FIG. 6A and illustrates the internal structure of the camera connector 206. FIG. 7A illustrates the camera connector 206. However, a base portion 250 and a lock lever 253, which will be described later, are omitted. FIG. 7B illustrates the camera connector 206 viewed from the front in the Z direction.

The camera connector 206 is provided on the bottom side in the Y direction (top side in FIG. 6A) of the base portion 250 of the external flash unit 120 as illustrated in FIG. 6B when it is attached to the accessory shoe 123 of the camera 100. The camera connector 206 includes a shoe attachment leg (engagement member, shoe plate) 251, the lock pins 252, a lock lever 253, a holding member 254, a connection plug 256, and a Y-direction holding member 258.

The shoe attachment leg 251 is an engagement member that engages the external flash unit 120 with the accessory shoe 123 of the camera 100 and holds it. That is, the shoe attachment leg 251 is an engagement member on the external flash unit 120 side attachable to and detachable from the engagement member 151 of the accessory shoe 123.

A large stress is applied to the accessory shoe 123 and the camera connector 206 due to the pressure for maintaining the attachment state and the external force (impact, etc.) acting on the external flash unit 120. The shoe attachment leg 251 is manufactured by processing a metal plate (sheet metal) in order to secure a high mechanical strength against such a large stress.

The lock pin 252 is a member for preventing the external flash unit 120 from falling off while the camera connector 206 (shoe attachment leg 251) is attached to the accessory shoe 123, and is held on the shoe attachment leg 251 movable in the Y direction. More specifically, the lock pin 252 is slidably held in the Y direction by the Y-direction holding member 258. The lock lever 253 and the Y-direction holding member 258 are held by the holding member 254.

When the external flash unit 120 is attached to the accessory shoe 123 and the lock lever 253 is rotated, the Y-direction holding member 258 is moved downwardly in the Y-direction in FIG. 6B by an unillustrated cam portion. At that time, the lock pin 252 also moves downwardly in the Y direction in FIG. 6B together with the Y-direction holding member 258. Thereby, the lock pin 252 projects from the shoe attachment leg 251 and is engaged with the engagement hole portion 156 provided in the engagement member 151 of the accessory shoe 123. The lock pin 252 and the engagement hole portion 156 serve as a positioning member in the Z direction for ensuring an electrical connection between the external flash unit 120 and the camera 100.

The connection plug 256 as a connector is provided on the front side in the Z direction of the camera connector 206, made of a nonconductive material (dielectric material) such as a resin material, and integrated with the holding member 254. An outermost width T of the connection plug 256 in the X direction is narrower than a width W of the shoe attachment leg 251 in the X direction. Thereby, an area for providing the contact portion 251b on the shoe attachment leg 251 is secured. The connection plug 256 has a plurality of connection terminals 257 for contacting and communicating with the plurality of connection terminals 152a of the accessory shoe 123 illustrated in FIG. 5C.

The plurality of connection terminals 257 are provided so as to have a one-to-one correspondence with the plurality of connection terminals 152a, and held by the holding member 254 so as to extend in the Z direction and to line up in the X direction. Each connection terminal 257 has a tip portion 257a that comes into contact with the corresponding connection terminal 152a. Each connection terminal 257 has a shape extending backwardly in the Z direction from a tip portion 257a, and has an extension portion 257b that displaces the tip portion 257a upwardly in the Y direction in FIG. 6B by an elastic deformation when the tip portion 257a comes into contact with the connection terminal 152a. A vertical extension portion 257c extending upwardly in the Y direction is formed at the back end of the extension portion 257b in the Z direction. Provided at the upper end of the vertical extension portion 257c is a flexible substrate connector 257d to be connected to an unillustrated main substrate of the external flash unit 120 and connected to a flexible substrate 259 inserted into the holding member 254 from the top side in the Y direction.

The extension portion 257b has a step portion 257e having a step in the Y direction in the middle of the Z direction. As described above, the extension portion 257b can be elastically deformed in the Y direction. However, when the distance L in the Z direction of the extension portion 257b is short, a sufficient deformation amount cannot be obtained, and the durability is lowered. As a result, the connection terminal 152a and the tip portion 257a are repeatedly attached and detached, and the extension portion 257b may easily get damaged. Accordingly, providing the step portion 257e to the extension portion 257b can secure a sufficient distance L without causing the extension portion 257b to interfere with the shoe attachment leg 251.

As illustrated in FIGS. 7A and 7B, there are a pair of protrusion portions 256a that project downwardly in the Y direction (third direction) so as to sandwich a plurality of connection terminals 257 at both ends of the connection plug 256 in the X direction. That is, a pair of protrusion portions 256a are provided on both outer sides of the plurality of connection terminals 257. As illustrated in FIG. 7B, a lower tip portion 256d of each protrusion portion 256a protrudes below a line made by connecting the lower ends of the tip portions 257a of the connection terminals 257 in order to protect the connection terminals 257 from external forces such as the pressure and the impact. That is, the tip portions 257a of the connection terminals 257 is provided above (inside) a line made by connecting the lower tip portions 256d of the pair of protrusion portions 256a.

There is a slope portion 256b on the outer side (outer surface) of each protrusion portion 256a in the X direction, which serves as an outer surface that extends diagonally upwardly from the lower tip portion 256d and faces diagonally downwardly, that is, has a tilt to the X direction. In other words, each protrusion portion 256a is provided with the slope portion 256b on a side that does not face the plurality of connection terminals 257 so that a width of each protrusion portion 256a in the X direction is smaller at a position of the tip in the Y direction than at a position away from the tip. Since each protrusion portion 256a has such a shape, the connection plug 256 can be inserted into the groove portion 152c having the slope portion 152d in the connection terminal connector 152.

Figure 7C:
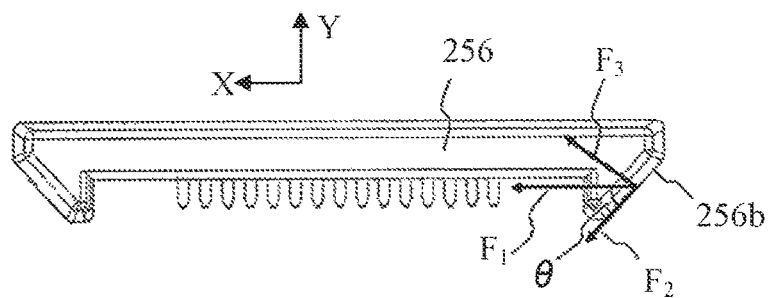
FIG. 7C is a partially enlarged view of the camera connector.

The slope portion 256b has a role of releasing an external force, such as the pressure and impact, from the connection plug 256 to prevent the connection plug from getting damaged. For example, FIG. 7C illustrates that an external force is applied to the connection plug 256 from the X direction. FIG. 7C illustrates the connection plug 256 viewed from the front in the Z direction.

An external force from the X direction is defined as $F_1$ as a vector. The external force $F_1$ acting on the slope portion 256b is decomposed according to the addition theorem in the vector space into a component force $F_2$ in a direction along the slope portion 256b and a component force $F_3$ in a direction perpendicular to the slope portion 256b. Where $\theta$ is an angle formed by the external force $F_1$ and the slope portion 256b, the component force $F_2$ and the component force $F_3$ can be calculated by the following expression (1).

$$F_2 = F_1 \cos\theta \quad (1)$$
$$F_3 = F_1 \sin\theta$$

When the slope portion 256b is provided, $\theta$ is $0° < \theta < 90°$. In this range, the following is established:

$$F_2 < F_1 \quad (2)$$
$$F_3 < F_1$$

Since the component force $F_2$ escapes in the direction along the slope portion 256b, the component force $F_3$ is the only force that affects the connection plug 256. As described above, since the component force $F_3$ is smaller than the component force $F_1$, the connection plug 256 can be prevented from getting damaged even if an external force that is large to some extent is applied.

By forming the slope portions 256b on both sides in the X direction so that its width in the X direction becomes narrower toward the lower side in the Y direction, not only the external force from the X direction but also the external force from the bottom side in the Y direction can be partially released.

Figure 12:
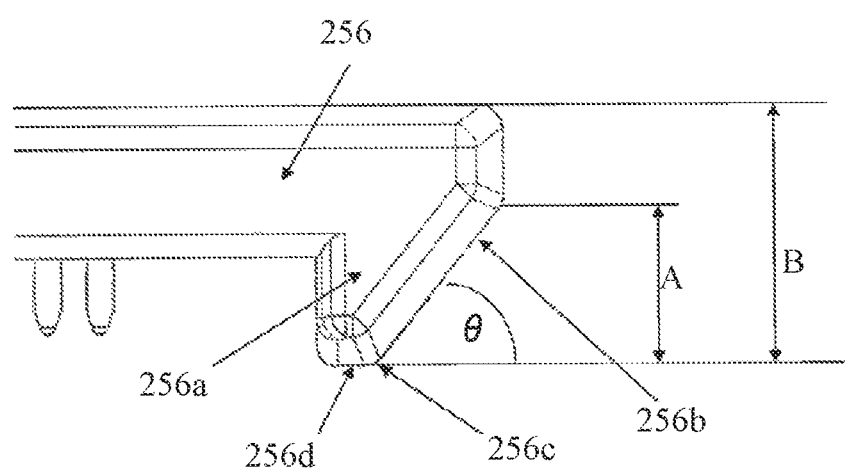
FIG. 12 is a partially enlarged view of a connection plug according to the first and second embodiments.

FIG. 12 illustrates the partially enlarged connection plug 256 viewed from the Z direction. In the Y direction, assume that B is a height from the lower tip portion 256d of the protrusion portion 256a to the top surface of the connection plug 256 (a height of the connection plug including the protrusion portion), and A is a height of the slope portion 256b from the lower tip portion 256d (slope start position 256c) to the upper end of the slope portion 256b. At this time, A is preferably one-fifth or more of B, more preferably one-fourth or more, one-third or more, or half or more as illustrated in FIG. 12. That is, the slope portion 256b is formed to have a significant size for the function of releasing the external force from the X direction, and is different from a chamfered shape generally provided at the corner of the protrusion portion. The tilt angle $\theta$ of the slope portion 256b to the X direction is preferably set in a range of 45°±20° for the above function of releasing the external force.

In order to secure a sufficient area for the contact portion 251b on the shoe attachment leg 251 relative to the contact surface 152b of the accessory shoe 123 as the positioning portion in the Z direction, it is preferable to make as short as possible the width in the X direction between slope start positions 256c at the lower tip portions 256d of the slope portions 256b on both sides. This embodiment sets the width between the slope start positions 256c in the X direction inside the width V of the holding member 254 in the X direction. In other words, in this embodiment, the contact portion, which is a portion that comes into contact with the contact surface 152b of the accessory shoe 123 and is provided at a position between a shoe engagement portion 251a and the protrusion portion 256a in the X direction, has a different width in the X direction in an area that contacts the contact surface 152b, depending on a position in the Y direction. In this embodiment, a position closer to the tip of the protrusion portion 256a in the Y direction has a wider width in the X direction in the area that contacts the contact surface 152b. In other words, in this embodiment, the lower tip portion 256d, which is the lower end in the Y direction of the tip portion in the Z direction, is not provided at a position that is below the plurality of connection terminals 257 in the Y direction and outside of the end of the shoe engagement portion 251a on the side of the plurality of connection terminals 257 in the X direction. In this embodiment, the lower tip portion 256d is provided at a position lower than the plurality of connection terminals 257 in the Y direction. In this embodiment, the lower tip portion 256d is provided at a position inside the end of the shoe engagement portion 251a on the side of the plurality of connection terminals 257 in the X direction. This configuration can secure a sufficient area of the contact portion 251b.

The camera connector 206 has such a structure that the shoe attachment leg 251 and the holding member 254 are fastened. The details of this fastening structure will be described later.

The holding member 254 can be inserted into the engagement portion interval 151aa of the engagement member 151 of the accessory shoe 123 illustrated in FIG. 5A, and has a coupler 254a having a width V shorter than the width W of the shoe attachment leg 251 in the X direction. The widths W and V are defined by the Japanese Industrial Standards (JIS) B7101-1975 "camera accessory attachment seat and attachment foot." When the coupler 254a is engaged with the engagement member 151, the position of the external flash unit 120 relative to the camera 100 is determined in the X direction. The shoe attachment leg 251 is urged upwardly in the Y direction when it comes into contact with the elastic deformer 154a of the accessory shoe spring 154 as the urging member illustrated in FIGS. 4A and 4B. Thereby, the top surface of the shoe engagement portion 251a is brought into contact (pressure contact) with the bottom surface of the engagement member 151, and the position of the external flash unit 120 relative to the camera 100 is determined in the Y direction.

When the contact portion 251b of the shoe attachment leg 251 contacts the contact surface 152b on the front side in the Z direction of the connection terminal connector 152, the position of the external flash unit 120 relative to the camera 100 is determined in the Z direction.

The holding member 254 is also a structure for coupling the shoe attachment leg 251 and the base portion 250, and the lock pins 252 and the connection terminals 257 are arranged inside the coupler 254a.

Figure 8A:
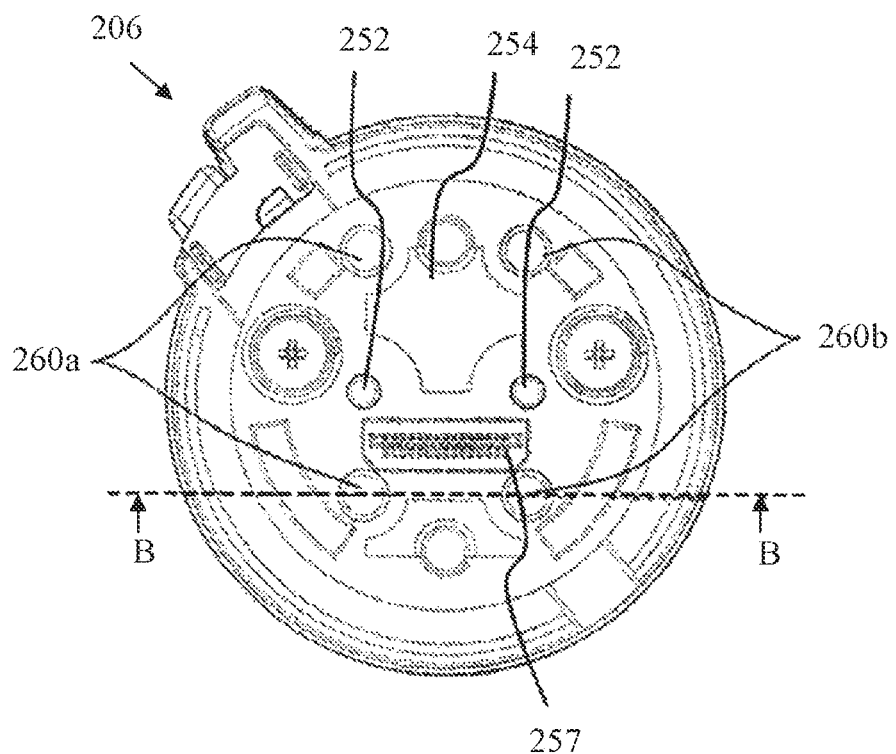
FIG. 8A is a top view of the camera connector.

Next follows a description of the fastening structure between the holding member 254 and the shoe attachment leg 251. FIG. 8A illustrates the camera connector 206 viewed from the upper side in the Y direction, and FIG. 8B illustrates a section taken along a line B-B in FIG. 8A.

A pair of first screw 260a and a pair of second screws 260b, which are fastening members for fastening the shoe attachment leg 251 to the holding member 254, penetrate the holding member 254 and are fastened to the shoe attachment leg 251. At this time, by disposing one screw in each of the four areas that are substantially equally divided in the X direction and the Z direction in a well-balanced manner, the shoe attachment leg 251 is stably held by the holding member 254. As described above, the shoe attachment leg 251 is a component to which a large stress is applicable. Therefore, a required mechanical strength can be ensured by fastening the metal shoe attachment legs 251 to the holding member 254 with a pair of first screws 260a and a pair of second screws 260b arranged in a well-balanced manner.

Figure 8B:
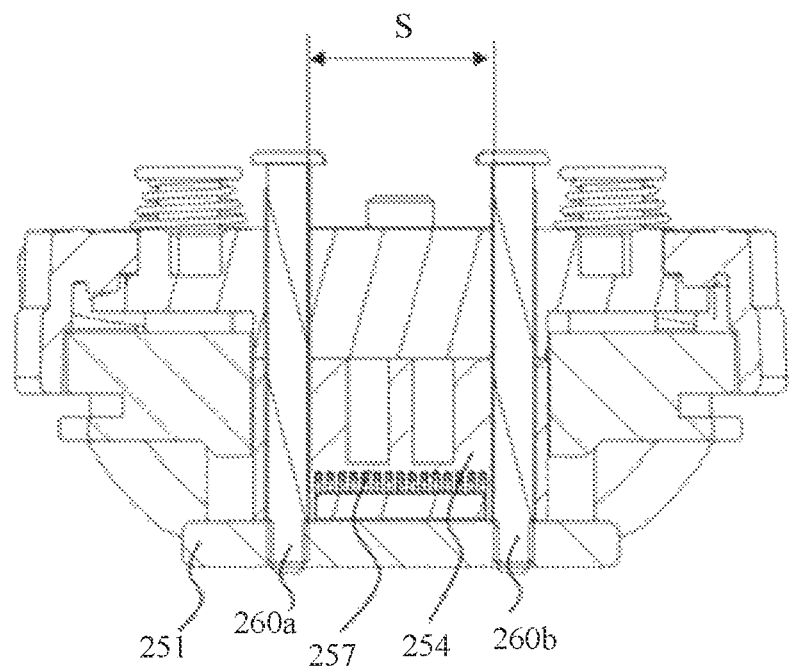
FIG. 8B is a sectional view of the camera connector.

As illustrated in FIG. 8B, a plurality of connection terminals 257 are arranged in an area S sandwiched by the pair of first screws 260a and the pair of second screws 260b. The widths between the pair of first screws 260a and between the pair of second screws 260b are narrower than the width between the lower tip portions 256d of the protrusion portions 256a of the connection plug 256, the width V of the holding member 254, the outermost width T of the connection plug 256, and the width W of the shoe attachment leg 251.

Figure 13:
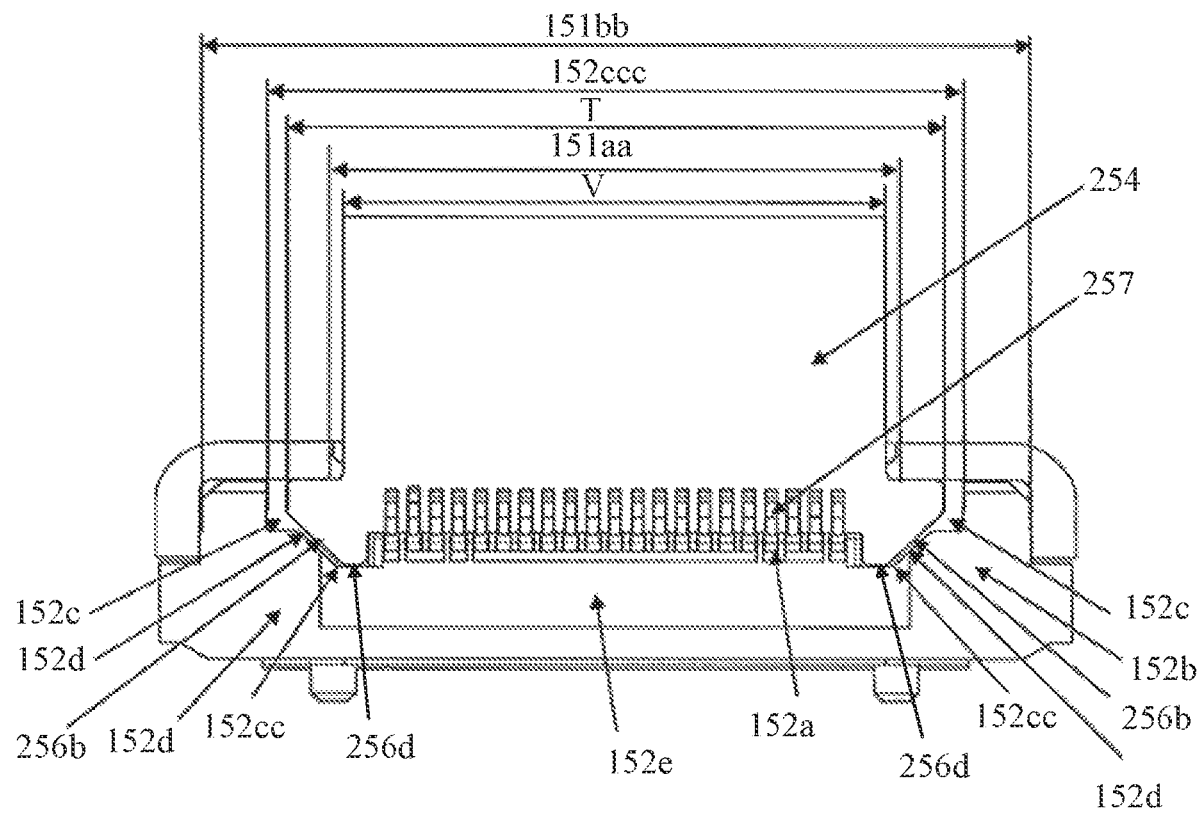
FIG. 13 is a front sectional view illustrating the camera connector attached to an accessory shoe according to the second embodiment.

FIG. 13 illustrates a section of the accessory shoe 123 viewed from the Z direction while the camera connector 206 is attached to the accessory shoe 123. This figure illustrates the sizes T and V of the camera connector 206 and the positional relationship between each component of the camera connector 206 and each component of the accessory shoe 123.

In FIG. 13, as described above, the top surface of the shoe engagement portion 251a of the camera connector 206 contacts the bottom (ceiling surface) of the engagement member 151 of the accessory shoe 123 for positioning in the Y direction.

On the other hand, none of the lower tip portion 256d and the slope portion 256b of the protrusion portion 256a of the connection plug 256 in the camera connector 206 contact the bottom surface and the slope portion 152d of the groove portion 152c of the accessory shoe 123, respectively. A gap between the lower tip portion 256d of the protrusion portion 256a and the bottom surface of the groove portion 152c of the accessory shoe 123 is set as small as possible. Thereby, when an external force in the X direction is applied to the external flash unit 120, the lower tip portion 256d of the protrusion portion 256a can come into contact with the bottom surface of the groove portion 152c of the accessory shoe 123, and a floating amount of the connection plug 256 (a tilt to the accessory shoe 123) can be reduced.

Each of a gap between the slope portions 256b and 152d and a gap between the inner end surface 152ccc of the groove portion 152c and the outer end surface of the connection plug 256 is set to be large to some extent. Thereby, when an external force in the X direction is applied to the external flash unit 120, the connection terminals 257 and 152a can be prevented from getting loaded.

In the groove portion 152c of the accessory shoe 123, a relationship between a height of the groove portion 152c in the Y direction (a height from the bottom surface of the groove portion 152c to a ceiling surface of the engagement member 151) and a height of the slope portion 152d in the Y direction is similar to a relationship between the height B of the connection plug 256 and the height A of the slope portion 256b in the camera connector 206. It is also preferable that the tilt angle of the slope portion 256b to the X direction is also set in the range of 45°±20°, similarly to the tilt angle θ of the slope portion 256b in the camera connector 206.

Each embodiment described above has described a surface shape of the slope portion 256b provided on the protrusion portion 256a being flat, but the slope portion 256b may be a curved surface having a curvature. That is, the slope portion 256b may have a surface with a tilt to the X direction.

This embodiment can secure an area for providing a larger number of connection terminals than ever and a shape for protecting them and an area for positioning between components, in the compact camera connector 206 and accessory shoe 123.

Second Embodiment

Figure 9A:
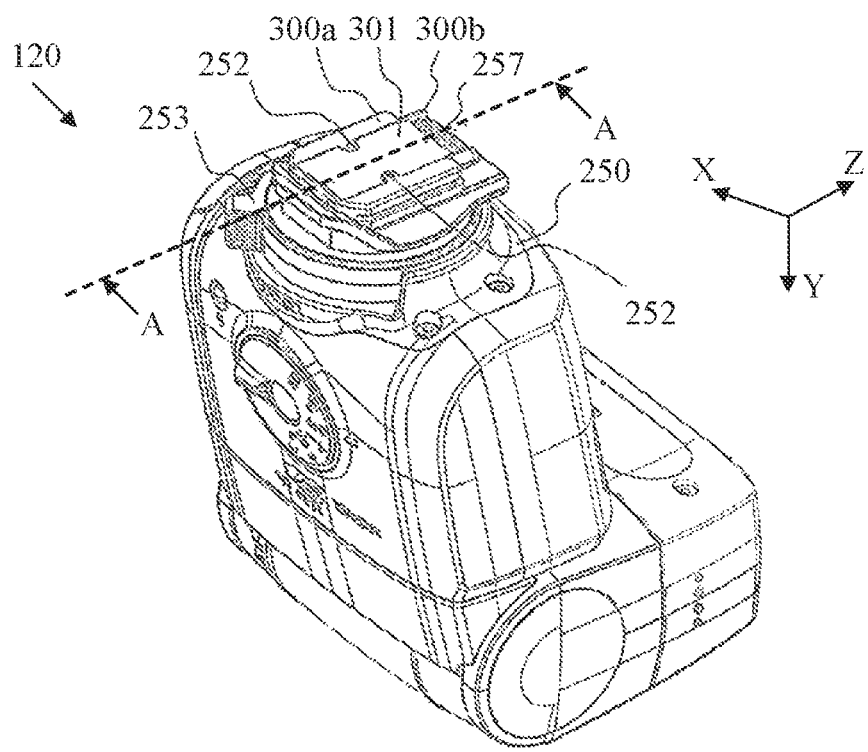
FIG. 9A is a bottom perspective view of an external flash unit according to a second embodiment of the present invention.
Figure 9B:
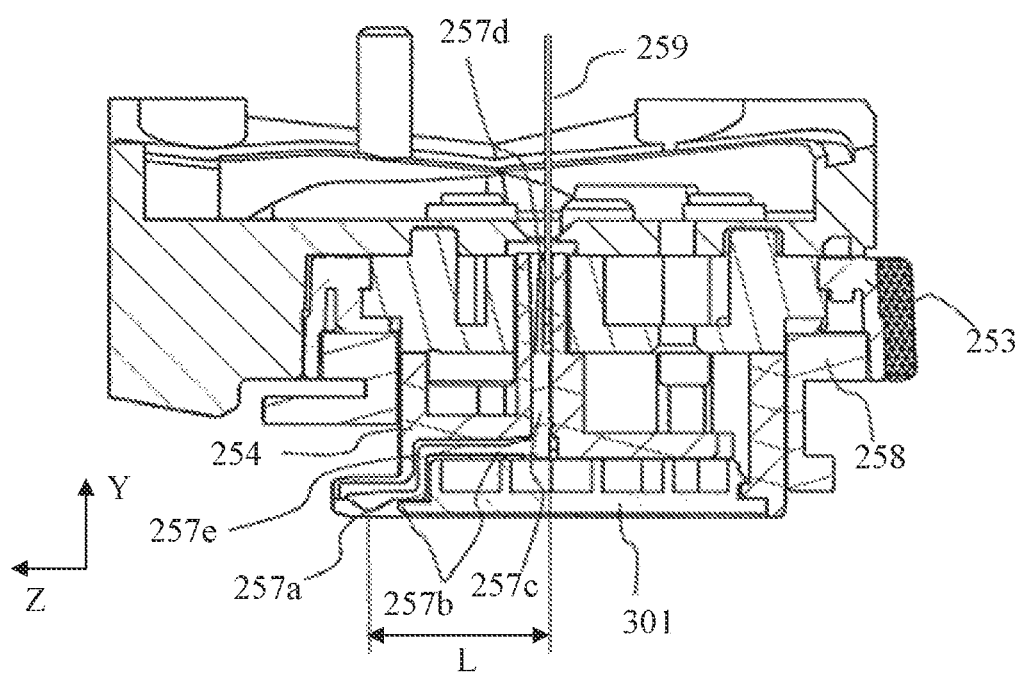
FIG. 9B is a sectional view of the external flash unit according to the second embodiment.
Figure 10A:
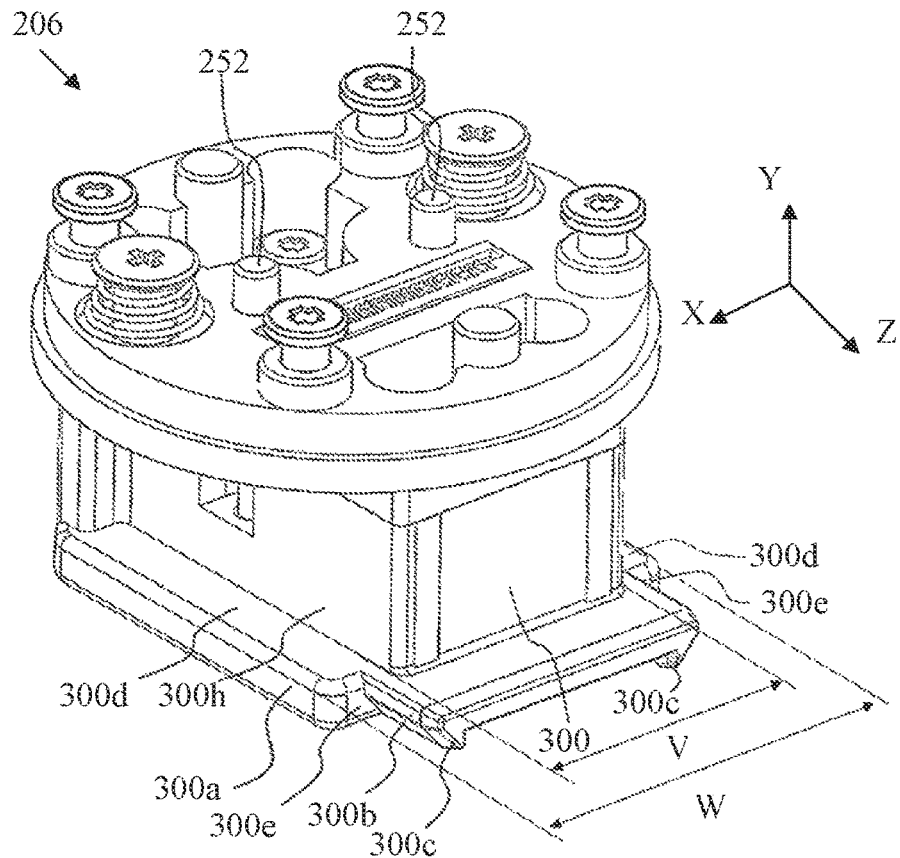
FIG. 10A is a perspective view illustrating an internal structure of a camera connector according to the second embodiment.
Figure 10B:
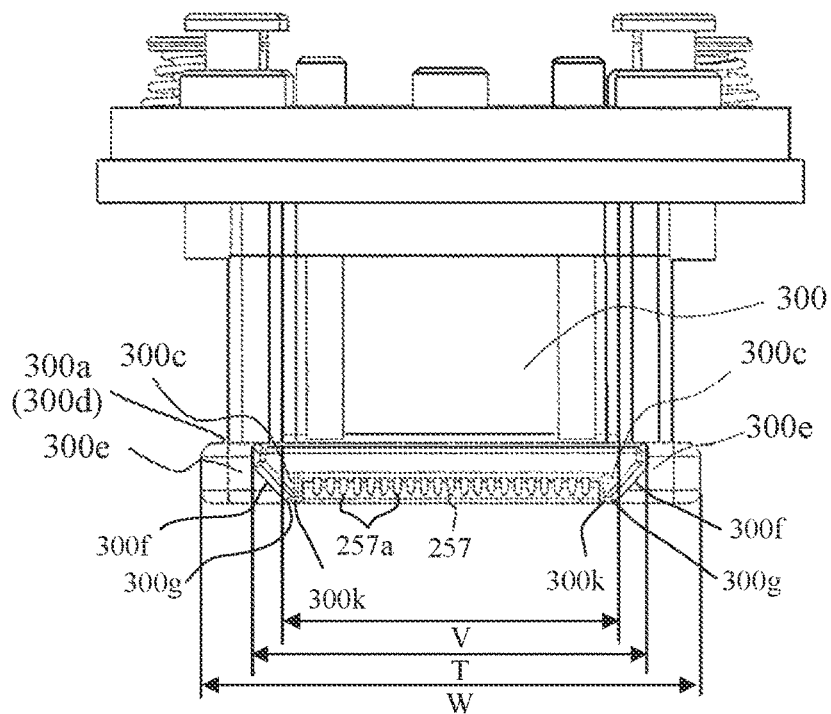
FIG. 10B is a front view illustrating the internal structure of the camera connector according to the second embodiment.

A description will now be given of an external flash unit 120 according to a second embodiment of the present invention. FIG. 9A illustrates the external flash unit 120 viewed from the camera connector 206 side (lower side in the Y direction). FIG. 9B illustrates a section taken along a line A-A in FIG. 9A and illustrates the internal structure of the camera connector 206. FIG. 10A illustrates the camera connector 206. However, the base portion 250 and the lock lever 253 are omitted. FIG. 10B illustrates the camera connector 206 viewed from the front in the Z direction.

The camera connector 206 is provided on the lower side in the Y direction (upper side in FIG. 9A) of the base portion 250 of the external flash unit 120 as illustrated in FIG. 9B while it is attached to the accessory shoe 123 of the camera 100. The camera connector 206 has a shoe attachment leg 300a, lock pins 252, a lock lever 253, a holding member 300, a connection plug 300b, a Y-direction holding member 258, and a shoe cover 301.

The shoe attachment leg 300a is an engagement member for engaging the external flash unit 120 with the accessory shoe 123 of the camera 100, similar to the shoe attachment leg 251 of the first embodiment. That is, the shoe attachment leg 300a is an engagement member on the external flash unit 120 side attachable to and detachable from the engagement member 151 of the accessory shoe 123.

In the first embodiment, the shoe attachment leg 251 as a metal shoe plate and the resin holding member 254 are formed as separate members in order to give priority to the mechanical strength. On the other hand, in this embodiment, the shoe attachment leg 300a and the holding member 300 are formed as an integrated member by a resin material (nonconductive material). Thereby, the pair of first screws 260a and the pair of second screws 260b described in the first embodiment are not required, a space for arranging the connection terminals 257 becomes wider, and thus a larger number of connection terminals 257 than that of the first embodiment can be arranged. As a result, the external flash unit 120 can communicate more information with the camera 100 via the camera connector 206 and the accessory shoe 123.

The connection plug 300b is provided on the front side in the Z direction of the camera connector 206, and formed as an integrated member with the holding member 300 made of a nonconductive resin material in this embodiment. Similar to the first embodiment, the outermost width T of the connection plug 300b in the X direction is made narrower than the width W of the shoe attachment leg 300a in the X direction, so that the area for providing the contact portion 300e is secured in the shoe attachment leg 300a. The connection plug 300b has a plurality of connection terminals 257 for contacting and communicating with the plurality of connection terminals 152a of the accessory shoe 123 illustrated in FIG. 5C. The shoe cover 301 is an enclosure attached to the holding member 300, and is a member that protects a plurality of connection terminals 257. The shape of the connection terminal 257 is similar to that of the first embodiment, and the step portion 257e is provided to secure a sufficient distance L in the Z direction of the extension portion 257b without interfering with the shoe cover 301.

The shape of the connection plug 300b is also similar to that of the connection plug 256 of the first embodiment, and a pair of protrusion portions 300c that project downwardly in the Y direction are provided so as to sandwich the plurality of connection terminals 257 at both ends of the connection plug 300b in the X direction. As illustrated in FIG. 10B, a lower tip portion 300k of each protrusion portion 300c projects below a line made by connecting the lower ends of the tip portions 257a of the connection terminals 257 in order to protect the connection terminal 257 from the external force such as the pressure and the impact. That is, the tip portion 257a of the connection terminal 257 is provided above (inside) a line made by connecting the lower tip portions 300k of the pair of protrusion portions 300c.

Even in this embodiment, provided on the outer side of each protrusion portion 300c in the X direction is a slope portion 300f that extends diagonally upwardly from the lower tip portion 300k and faces diagonally downwardly. Each protrusion portion 300c having such a shape enables the connection plug 300b to be inserted into the groove portion 152c having the slope portion 152d in the connection terminal connector 152 described in the first embodiment. As described in the first embodiment, the slope portion 300f has a role of releasing the external force such as the pressure and the impact on the connection plug 300b to prevent the connection plug from getting damaged.

Similar to the first embodiment, it is desirable to make as short as possible a distance in the X direction between the slope start positions 300g at the lower tip portion 300k of the slope portions 300f on both sides. Therefore, the slope start positions 300g on both sides are provided inside the width V of the holding member 254 in the X direction to sufficiently secure the area of the contact portion 300e of the shoe attachment leg 300a.

The holding member 300 is formed so that it can be inserted into the engagement portion interval 151aa of the engagement member 151 illustrated in FIG. 5A and engaged with the engagement member 151, and has a coupler 300h having a width V shorter than the width W of the shoe attachment leg 300a in the X direction. The width W and the width V are defined by the Japanese Industrial Standards (JIS) B7101-1975 "camera accessory attachment seat and attachment foot" as in the first embodiment. When the coupler 300h is engaged with the engagement member 151, the position of the external flash unit 120 relative to the camera 100 is determined in the X direction. The shoe attachment leg 300a is urged upwardly in the Y direction when it contacts the elastic deformer 154a of the accessory shoe spring 154 illustrated in FIGS. 4A and 4B, and thereby the top surface of the shoe engagement portion 300d contacts the bottom surface of the engagement member 151. Thereby, the position of the external flash unit 120 relative to the camera 100 is determined in the Y direction.

When the contact portion 300e of the shoe attachment leg 300a contacts the contact surface 152b on the front side in the Z direction of the connection terminal connector 152, the position of the external flash unit 120 relative to the camera 100 is determined in the Z direction.

The holding member 300 is also a structure for coupling the shoe attachment legs 300a and the base portion 250, and the lock pin 252 and the connection terminal 257 are arranged inside the coupler 300h.

Third Embodiment

Figure 14A:
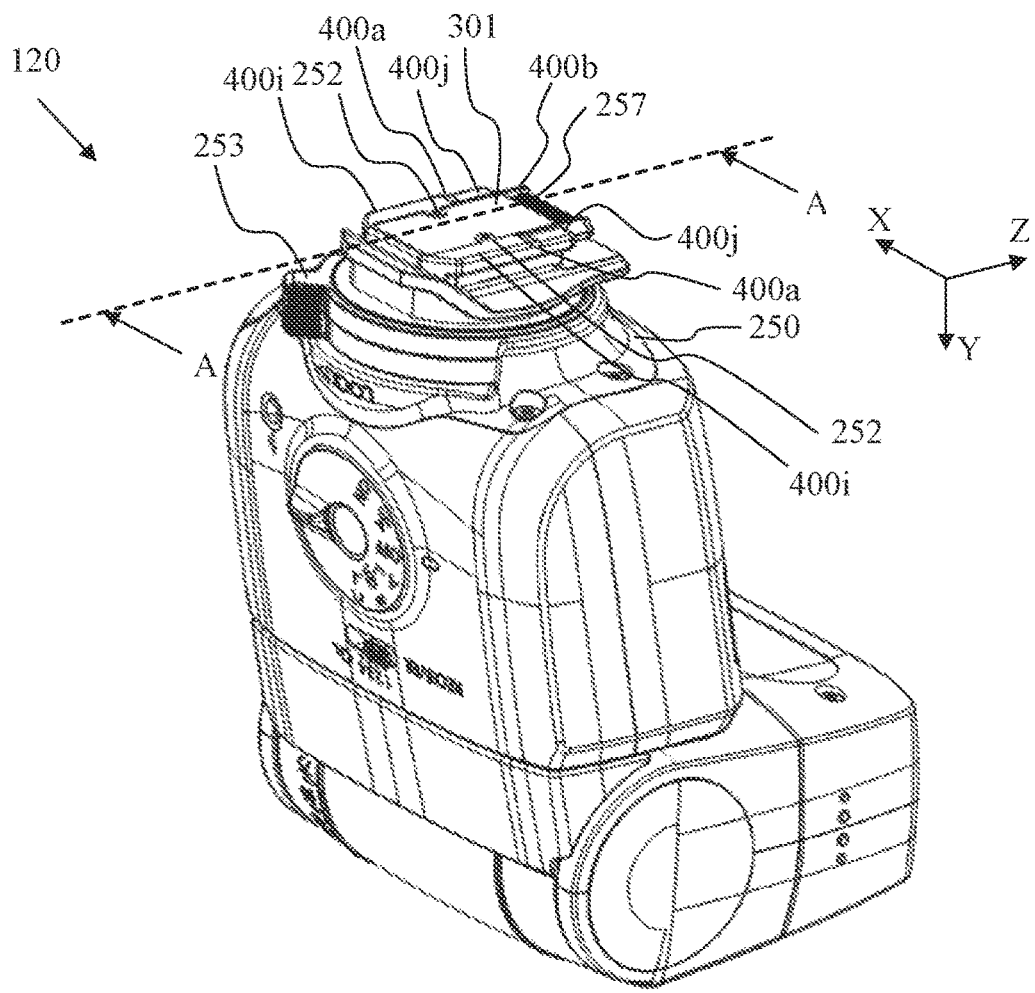
FIG. 14A is a bottom perspective view of an external flash unit according to a third embodiment of the present invention.
Figure 14B:
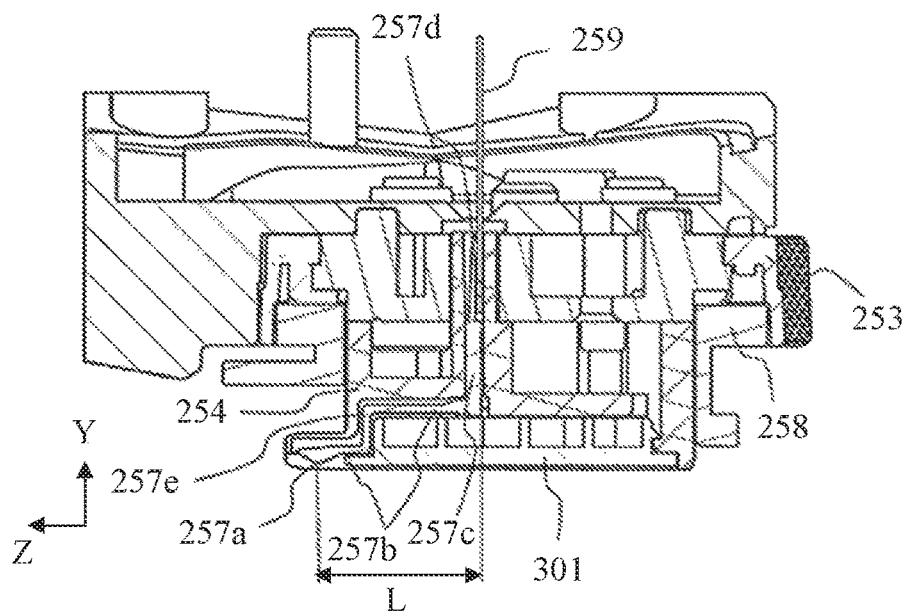
FIG. 14B is a sectional view of the external flash unit according to the third embodiment.
Figure 15A:
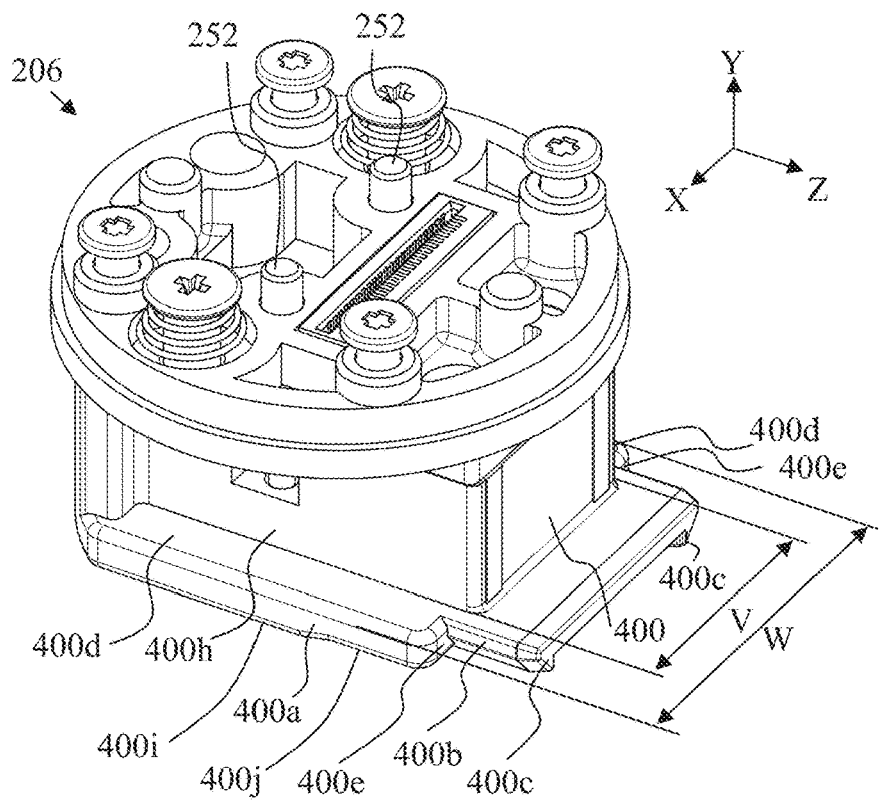
FIG. 15A is a perspective view illustrating an internal structure of a camera connector according to the third embodiment.
Figure 15B:
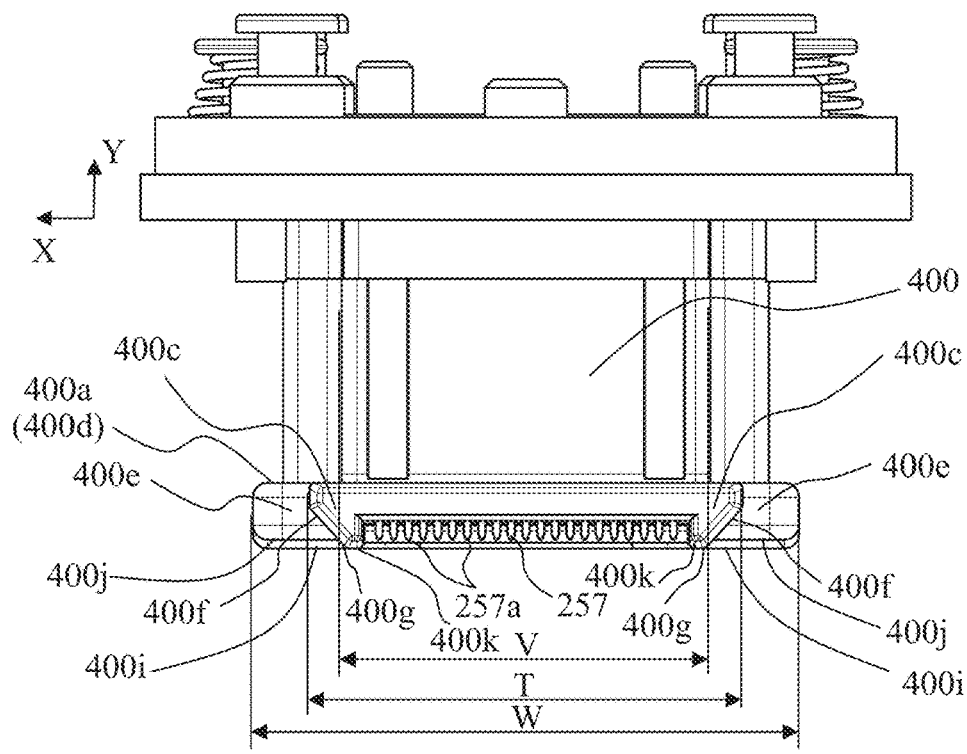
FIG. 15B is a front view illustrating the internal structure of the camera connector according to the third embodiment.

A description will now be given of an external flash unit 120 according to a third embodiment of the present invention. FIG. 14A illustrates the external flash unit 120 viewed from the camera connector 206 side (lower side in the Y direction). FIG. 14B illustrates a section taken along a line A-A in FIG. 14A and illustrates the internal structure of the camera connector 206. FIG. 15A illustrates the camera connector 206. However, the base portion 250 and the lock lever 253 are omitted. FIG. 15B illustrates the camera connector 206 viewed from the front in the Z direction.

Figure 16A:
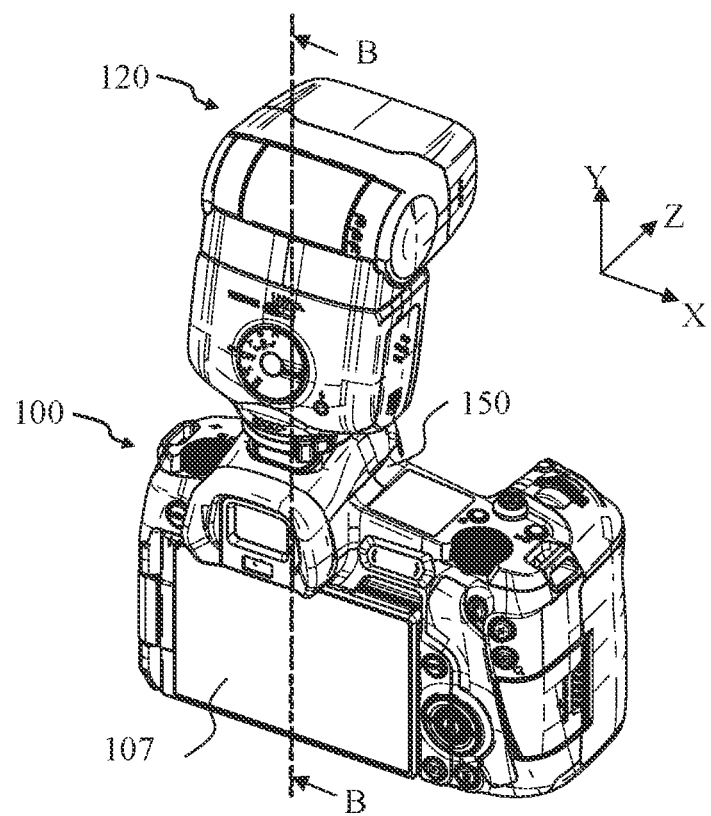
FIG. 16A is a rear perspective view of a digital camera and the external flash unit according to the third embodiment.
Figure 16B:
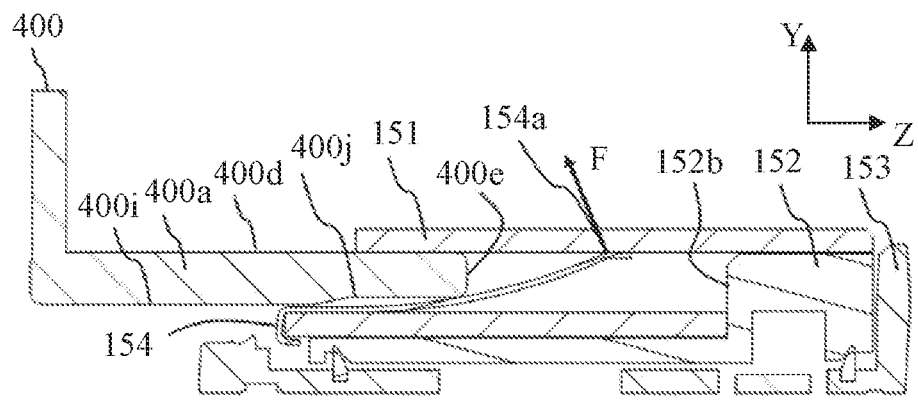
FIG. 16B is a sectional view illustrating a state in the middle of an insertion between a camera connector and an engagement member according to the third embodiment.
Figure 16C:
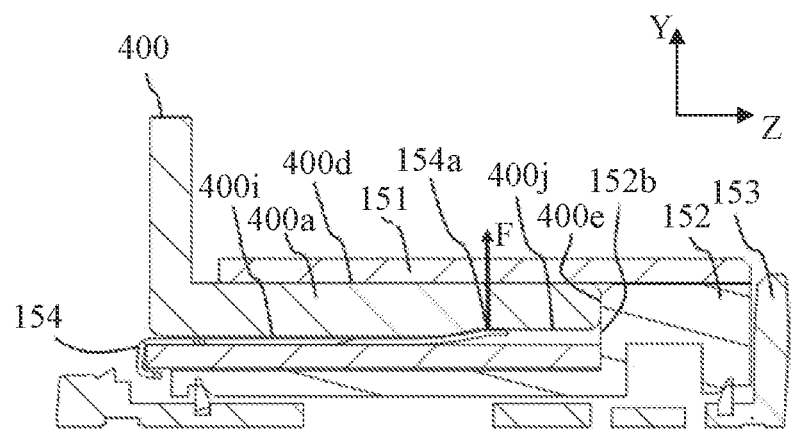
FIG. 16C is a sectional view illustrating an insertion completed state between the camera connector and the engagement member according to the third embodiment.

FIG. 16A illustrates the external flash unit 120 attached to the camera 100 viewed from the diagonally rear side. FIG. 16B illustrates a section taken along a line B-B in FIG. 16A, which shows a state in the middle of an insertion of the camera connector 206 (shoe attachment leg 400a) of the external flash unit 120 into the accessory shoe 123 (engagement member 151) of the camera 100. FIG. 16C illustrates the same section as that of FIG. 16B, which shows an insertion completed state of the shoe attachment leg 400a into the accessory shoe 123 and a holding state of the shoe attachment leg 400a by the accessory shoe 123.

The shoe attachment leg 400a is an engagement member for engaging the external flash unit 120 with the accessory shoe 123 of the camera 100, similar to the shoe attachment leg 251 of the first embodiment. That is, the shoe attachment leg 400a is an engagement member on the external flash unit 120 side that can be attached to and detached from the engagement member 151 of the accessory shoe 123.

The shoe attachment leg 400a and the holding member 400 are formed as an integrated member by a resin material (nonconductive material), similar to the shoe attachment leg 300a and the holding member 300 of the second embodiment. Thereby, the pair of first screws 260a and the pair of second screws 260b described in the first embodiment are not required, and the space for arranging the connection terminals 257 becomes wider, so that a larger number of connection terminals 257 can be arranged than that of the first embodiment. As a result, the external flash unit 120 can communicate more information with the camera 100 via the camera connector 206 and the accessory shoe 123.

The connection plug 400b is provided on the front side in the Z direction of the camera connector 206, and is formed as an integrated member with the holding member 400 made of a nonconductive resin material as in the second embodiment. Similar to the first and second embodiments, when the outermost width T of the connection plug 400b in the X direction is made narrower than the width W of the shoe attachment leg 400a in the X direction, the area for providing the contact portion 400e in the shoe attachment leg 400a is secured. The connection plug 400b includes a plurality of connection terminals 257 that contact and communicate with the plurality of connection terminals 152a of the accessory shoe 123 illustrated in FIG. 5C. The shoe cover 301 is an enclosure attached to the holding member 400, and is a member that protects a plurality of connection terminals 257. The shape of the connection terminal 257 is similar to that of each of the first and second embodiments, and the step portion 257e is provided to secure a sufficient distance L in the Z direction of the extension portion 257b without interfering with the shoe cover 301.

The shape of the connection plug 400b is also similar to that of the connection plug 256 of the first and second embodiments, and a pair of protrusion portions 400c that protrude downwardly in the Y direction are provided on both sides of the pair of connection plugs 400b in the X direction so as to sandwich the plurality of connection terminals 257. As illustrated in FIG. 15B, the lower tip portion 400k of each protrusion portion 400c protrudes below a line made by connecting the lower ends of the tip portions 257a of the connection terminals 257 in order to protect the connection terminal 257 from the external force such as the pressure and the impact. That is, the tip portions 257a of the connection terminals 257 are provided above (inside) a line made by connecting the lower tip portions 400k of the pair of protrusion portions 400c.

This embodiment also provides, outside each protrusion portion 400c in the X direction, a slope portion 400f that extends diagonally upwardly from the lower tip portion 400k and faces diagonally downwardly. Each protrusion portion 400c having such a shape enables the connection plug 400b to be inserted into the groove portion 152c having the slope portion 152d in the connection terminal connector 152 described in the first embodiment. As described in the first and second embodiments, the slope portion 400f has a role of releasing the external force such as the pressure and the impact on the connection plug 400b to prevent the connection plug from getting damaged.

Even in the first and second embodiments, it is desirable to make a distance as short as possible in the X direction between the slope start positions 400g at the lower tip portions 400k of the slope portions 400f on both sides. Therefore, the slope start positions 400g on both sides are provided inside the width V of the holding member 254 in the X direction to sufficiently secure an area for the contact portion 400e of the shoe attachment leg 400a.

The holding member 400 is formed so that it can be inserted into the engagement portion interval 151aa of the engagement member 151 illustrated in FIG. 5A and can be engaged with the engagement member 151, and has a connector 400h having the width V shorter than the width W of the shoe attachment leg 400a in the X direction. The width W and the width V are defined by the Japanese Industrial Standards (JIS) B7101-1975 "camera accessory attachment seat and attachment foot" as in the first and second embodiments. When the connector 400h is engaged with the engagement member 151, the position of the external flash unit 120 relative to the camera 100 is determined in the X direction.

The holding member 400 is also a structure for coupling the shoe attachment leg 400a and the base portion 250, and the lock pin 252 and the connection terminal 257 are arranged inside the connector 400h.

As illustrated in FIGS. 16B and 16C, the shoe attachment leg 400a has a contact area (first area) 400j that contacts the elastic deformer 154a of the accessory shoe spring 154 illustrated in FIGS. 4A and 4B. When the contact area 400j contacts the elastic deformer 154a of the accessory shoe spring 154, the shoe attachment leg 400a is urged upwardly in the Y direction, and the top surface of the shoe engagement portion 400d comes into contact with the bottom surface of the engagement member 151. An arrow F in FIGS. 16B and 16C represents the urging force of the accessory shoe spring 154. Thereby, the position of the external flash unit 120 with respect to the camera 100 is determined in the Y direction. The contact area 400j corresponds to the urging area urged by the elastic deformer 154a of the accessory shoe spring 154 in the middle of an insertion and in the insertion completed state of the external flash unit 120 into the accessory shoe 123. A contact area 400j is disposed on both sides of the plurality of connection terminals 152a on the front side (front side of the camera 100) in the Z direction as the attachment direction.

The shoe attachment leg 400a has a noncontact area (second area) 400i that does not contact the elastic deformer 154a of the accessory shoe spring 154. This noncontact area 400i corresponds to a non-urged area that is not urged by the elastic deformer 154a of the accessory shoe spring 154 in the middle of the insertion and in the insertion completed state of the external flash unit 120 into the accessory shoe 123. In FIG. 16C, since a gap is formed between the accessory shoe spring 154 and the noncontact area 400i, the urging force by the accessory shoe spring 154 against the noncontact area 400i is 0.

This embodiment sets the thickness of the noncontact area 400i in the Y direction to be larger than the thickness of the contact area 400j in the same direction. The thickness of the contact area 400j is set to be the same as that of the first and second embodiments. The thickness of the noncontact area 400i in the Y direction is made larger than the contact area 400j for the following reasons.

The resin shoe in this embodiment is inferior in strength to the metal shoe of the first embodiment when they are compared with each other in the same shape. Therefore, the strength can be ensured by increasing the thickness of the shoe attachment leg 400a in the non-contact area 400i in the Y direction. When the strength calculated by the moment of inertia of area increases in proportion to the square of the thickness, the strength can be efficiently improved by increasing the thickness in the Y direction. By making the noncontact area 400i in the Z direction longer than the contact area 400j in the Z direction, a more strength can be secured.

By making the thickness of the contact area 400j the same as that of the first and second embodiments, the shoe attachment leg 400a is made versatile according to the JIS, and the elastic deformer 154a of the accessory shoe spring 154 can be prevented from plastically deforming beyond the yield point. When the external flash unit 120 is attached to the accessory shoe 123, in order to make the attachment load the same as that of each of the first and second embodiments, the thickness of the contact area 400j in the Y direction is made the same as that of each of the first and second embodiments.

Since the noncontact area 400i is provided on the attachment side of the contact area 400j in the Z direction, the elastic deformer 154a can be prevented from plastically deforming beyond a yield point even in the middle of the attachment of the external flash unit 120 to the accessory shoe 123.

This embodiment sets the noncontact area 400i to a non-urged area that is not urged by the elastic deformer 154a of the accessory shoe spring 154 in the middle of the insertion and in the insertion completed state of the external flash unit 120 into the accessory shoe 123. However, the noncontact area 400i may be urged by the accessory shoe spring 154 in the middle of the insertion and in the insertion completed state of the external flash unit 120 into the accessory shoe 123. In that case, while the external flash unit 120 is held by the accessory shoe 123, the area in which the urging force by the accessory shoe spring 154 is smaller than the contact area 400j may be set to the area corresponding to the noncontact area 400i. That is, the thickness of the second area of the shoe attachment leg 400a is larger than that of the first area, and the second area has a smaller urging force (including an urging force of zero) by the accessory shoe spring 154 than that of the first area.

When the contact portion 400e of the shoe attachment leg 400a contacts the contact surface 152b on the front side in the Z direction of the connection terminal connector 152, the position of the external flash unit 120 relative to the camera 100 is determined in the Z direction.

Each of the above embodiments can secure, in the compact shoe apparatus and accessory shoe apparatus, an area for providing a larger number of connection terminals than ever and a shape for protecting them and an area for positioning between components.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention provides a compact shoe apparatus and accessory shoe apparatus, each of which can secure an area for providing a large number of connection terminals and a shape for protecting them, and a positioning area between components.

What is claimed is:

1. A shoe apparatus comprising:
an engagement portion with an accessory shoe apparatus included in an electronic apparatus;
a plurality of connection terminals, where a first direction is an attachment direction to the accessory shoe apparatus, which are arranged in a second direction orthogonal to the first direction, and located on a front side of the engagement portion in the attachment direction; and
a connector that includes protrusion portions that protrude in a third direction orthogonal to the first and second directions on both outer sides of the plurality of connection terminals in the second direction,
wherein each of the protrusion portions includes a slope portion on a side far from the plurality of connection terminals in the second direction such that a width in the second direction at a position of a tip in the third direction is narrower than a width in the second direction at a position away from the tip in the third direction, and
wherein in an area where a position in the third direction is a first position in each of the protrusion portions, the slope portion has a larger inclination with respect to the third direction than a surface on a side near to the plurality of connection terminals in the second direction of the protrusion portion.

2. The shoe apparatus according to claim 1, wherein a height of the slope portion is one-fifth or more of a height of the connector including the protrusion portions in the third direction.

3. The shoe apparatus according to claim 1, wherein the slope portion has a tilt angle in a range of 45°±20° to the second direction.

4. The shoe apparatus according to claim 1, comprising a holding member configured to hold the plurality of connection terminals,
wherein the connector has such part that a width between slope portions of the protrusion portions on both outer sides of the plurality of connection terminals is narrower than a width of the holding member in the second direction.

5. The shoe apparatus according to claim 1, wherein an outermost width of the connector in the second direction is narrower than a width of the engagement portion in the second direction.

6. The shoe apparatus according to claim 1, wherein a thickness of the engagement portion varies in the third direction depending on a position in the first direction.

7. The shoe apparatus according to claim 6, wherein the engagement portion has a first area urged in the third direction by an urging member provided to the accessory shoe apparatus while the engagement portion is held by the accessory shoe apparatus, and a second area in which an urging force by the urging member is smaller than that of the first area, and
wherein the first area and the second area are arranged in the first direction, and a thickness of the second area in the third direction is larger than that of the first area.

8. The shoe apparatus according to claim 7, wherein the first area includes a contact portion with an elastic deformer in the urging member for urging the engagement portion in the third direction in a middle of an attachment of the shoe apparatus to the accessory shoe apparatus.

9. The shoe apparatus according to claim 8, wherein the second area is an area that is not urged by the elastic deformer while held by the accessory shoe apparatus.

10. The shoe apparatus according to claim 7, wherein the engagement portion is configured so that a length of the second area in the first direction is longer than that of the first area.

11. The shoe apparatus according to claim 7, wherein the engagement portion is configured so that the first area is provided on a front side of the second area in the attachment direction in the first direction.

12. An accessory comprising the shoe apparatus according to claim 1.

13. A shoe apparatus comprising:
an engagement portion with an accessory shoe apparatus included in an electronic apparatus;
a plurality of connection terminals, where a first direction is an attachment direction to the accessory shoe apparatus, which are arranged in a second direction orthogonal to the first direction, and located on a front side of the engagement portion in the attachment direction;
a connector that includes protrusion portions that protrude in a third direction orthogonal to the first and second directions on both outer sides of the plurality of connection terminals in the second direction; and
a contact portion provided at a position between the engagement portion and each of the protrusion portions in the second direction and configured to contact the accessory shoe apparatus,
wherein the contact portion is configured so that a width in the second direction in an area that contacts the accessory shoe apparatus is larger at a position closer to a tip of the protrusion portion in the third direction.

14. The shoe apparatus according to claim 13, wherein the contact portion is not provided on a front side of the connector in the attachment direction.

15. A shoe apparatus comprising:
an engagement portion with an accessory shoe apparatus included in an electronic apparatus;
a plurality of connection terminals, where a first direction is an attachment direction to the accessory shoe apparatus, which are arranged in a second direction orthogonal to the first direction, and located on a front side of the engagement portion in the attachment direction; and a connector located at a position at which the connector is aligned with the plurality of connection terminals in a third direction orthogonal to the first direction and the second direction, wherein the engagement portion is located at a position outside the plurality of connection terminals in the second direction, wherein the connector is configured so that a lower end in the third direction of a tip portion in the first direction is not provided at a position that is below the plurality of connection terminals in the third direction and outside of an end of the engagement portion on a side of the plurality of connection terminals in the second direction, and wherein the connector is configured so that the lower end in the third direction of the tip portion in the first direction is located at a position inside an end on a side of the plurality of connection terminals in the second direction of the engagement portion.

16. The shoe apparatus according to claim 15, wherein the connector is configured so that the lower end in the third direction of the tip portion in the first direction is located at a position below the plurality of connection terminals in the third direction.

17. An accessory shoe apparatus attachable to and detachable from an accessory in a first direction, the accessory shoe apparatus comprising:
a plurality of connection terminals arranged in a second direction orthogonal to the first direction;
a holding member configured to hold the plurality of connection terminals; and
an engagement portion with the accessory,
wherein the holding member includes groove portions on both outer sides of the plurality of connection terminals in the second direction, and wherein each of the groove portion includes a slope portion that faces an inside in the second direction and tilts to the second direction, and wherein in an area where a position in a third direction orthogonal to the first and second directions is a first position in each of the groove portions, the slope portion has a larger inclination with respect to the third direction than a surface facing an outer side in the second direction.

18. The accessory shoe apparatus according to claim 17, wherein a height of the slope portion is one-fifth or more of that of the groove portion in a third direction orthogonal to the first and second directions.

19. The accessory shoe apparatus according to claim 17, wherein the slope portion has a tilt angle in a range of 45°±20° to the second direction.

20. The accessory shoe apparatus according to claim 17, wherein the engagement portions are separated by a first width in the second direction, and the accessory can be inserted between them, and
wherein when viewed from the first direction, an end of the slope portion on a bottom surface side of each of the groove portions provided on the both sides is located at a position inside the first width in the second direction.

21. The accessory shoe apparatus according to claim 20, wherein when viewed from the first direction, an outermost inner surface in the second direction of each of the groove portions provided on the both sides is located outside of the first width in the second direction, and is located inside of an outermost inner surface in the engagement portion.

22. An electronic apparatus comprising the accessory shoe apparatus according to claim 17.

23. A shoe apparatus attachable to and detachable from the accessory shoe apparatus according to claim 17.

24. An accessory comprising the shoe apparatus according to claim 23.

* * * * *